(12) United States Patent
Winlund et al.

(10) Patent No.: US 12,443,275 B2
(45) Date of Patent: Oct. 14, 2025

(54) EYE TRACKING SYSTEM AND METHODS OF USING AN EYE TRACKING SYSTEM

(71) Applicant: TOBII AB, Danderyd (SE)

(72) Inventors: Paul Jones Winlund, Danderyd (SE); Morgan Viktorsson, Danderyd (SE); Theresia Hansson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 18/650,302

(22) Filed: Apr. 30, 2024

(65) Prior Publication Data

US 2024/0370084 A1    Nov. 7, 2024

(30) Foreign Application Priority Data

May 2, 2023  (SE) .................................... 2350526-6

(51) Int. Cl.
*G06F 3/01* (2006.01)
*A63F 13/213* (2014.01)
*G06F 3/0485* (2022.01)

(52) U.S. Cl.
CPC ............ *G06F 3/013* (2013.01); *A63F 13/213* (2014.09); *G06F 3/012* (2013.01); *G06F 3/0485* (2013.01)

(58) Field of Classification Search
CPC ........ G06F 3/013; G06F 3/012; G06F 3/0485; A63F 13/213
See application file for complete search history.

(56) References Cited

U.S. PATENT DOCUMENTS

| 5,742,264 | A * | 4/1998 | Inagaki | G09G 5/397 348/E5.145 |
| 6,215,471 | B1 * | 4/2001 | DeLuca | G06F 3/0304 345/158 |
| 6,351,273 | B1 * | 2/2002 | Lemelson | G06F 3/013 704/271 |
| 6,628,283 | B1 * | 9/2003 | Gardner | G06F 3/04845 345/629 |

(Continued)

FOREIGN PATENT DOCUMENTS

| WO | 20170532971 A1 | 3/2017 |
| WO | 2017186320 A1 | 11/2017 |

OTHER PUBLICATIONS

Swedish Search Report regarding SE App. No. 2350526-6, date Nov. 28, 2023.

*Primary Examiner* — Benyam Ketema
(74) *Attorney, Agent, or Firm* — Christopher Ignatius Moylan

(57) ABSTRACT

A method of operating an eye tracking system to present a portion of displayable content to a user on a display screen. The displayable content covers a range of relative angles. The method comprises: receiving a head-pose-signal; receiving a gaze-signal; using the head-pose-signal to determine a sub-range of the relative angles of the displayable content; causing the display screen to present a portion of the displayable content to the user based on the determined sub-range of relative angles; and upon detecting that the gaze-signal represents a trigger location on the display screen: calculating a glance-induced offset based on the position of the trigger location; applying the glance-induced offset to the determined sub-range of relative angles to calculate an offsetted-sub-range of relative angles; and causing the display screen to present a portion of the displayable content to the user based on the calculated offsetted-sub-range of relative angles.

16 Claims, 16 Drawing Sheets

(56) References Cited

U.S. PATENT DOCUMENTS

| | | | |
|---|---|---|---|
| 8,643,680 B2* | 2/2014 | Baldwin | G06F 3/013 345/581 |
| 8,947,323 B1* | 2/2015 | Raffle | G02B 27/0093 345/157 |
| 9,864,498 B2* | 1/2018 | Olsson | G06F 3/013 |
| 9,940,518 B1* | 4/2018 | Klingström | G06V 40/193 |
| 10,082,863 B2* | 9/2018 | Kempinski | G06F 3/012 |
| 12,039,142 B2* | 7/2024 | Hylak | G06F 3/04845 |
| 2002/0044152 A1* | 4/2002 | Abbott, III | G06T 19/006 345/629 |
| 2002/0105482 A1* | 8/2002 | Lemelson | G06F 3/013 345/32 |
| 2002/0180799 A1* | 12/2002 | Peck | G06F 3/0485 715/784 |
| 2012/0256967 A1* | 10/2012 | Baldwin | G06F 3/013 345/684 |
| 2013/0219012 A1* | 8/2013 | Suresh | G09G 5/14 709/217 |
| 2013/0321265 A1* | 12/2013 | Bychkov | G06F 3/017 345/156 |
| 2014/0092139 A1* | 4/2014 | Sullivan | G02B 27/0093 345/649 |
| 2014/0191948 A1* | 7/2014 | Kim | H04M 1/0264 345/156 |
| 2014/0247232 A1* | 9/2014 | George-Svahn | G06F 3/012 345/184 |
| 2014/0268054 A1* | 9/2014 | Olsson | G06F 1/1686 351/209 |
| 2015/0128075 A1* | 5/2015 | Kempinski | G06F 3/012 715/765 |
| 2015/0309311 A1* | 10/2015 | Cho | G02B 27/017 345/8 |
| 2017/0091549 A1* | 3/2017 | Gustafsson | G02B 27/0093 |
| 2018/0181272 A1* | 6/2018 | Olsson | G06F 3/0485 |
| 2019/0138740 A1* | 5/2019 | Ricknäs | G06F 3/04842 |
| 2019/0163267 A1* | 5/2019 | Hainzl | G02B 27/017 |
| 2022/0068245 A1* | 3/2022 | Neustein | G06T 7/73 |
| 2023/0004223 A1* | 1/2023 | Zachrisson | H04N 25/135 |

* cited by examiner

EYE TRACKING SYSTEM AND METHODS OF USING AN EYE TRACKING SYSTEM

CROSS-REFERENCE TO RELATED APPLICATION

The present application claims priority to Swedish patent application No. 2350526-6, filed 2 May 2023, entitled "AN EYE TRACKING SYSTEM AND METHODS OF USING AN EYE TRACKING SYSTEM," and is hereby incorporated by reference in its entirety.

FIELD

The present disclosure generally relates to the field of eye tracking. In particular, the present disclosure relates to methods and systems for operating an eye tracking system to control the presentation of a portion of displayable content to a user on a display screen.

BACKGROUND

In eye tracking applications, digital images are retrieved of the eyes of a user and the digital images are analysed in order to estimate gaze direction of the user. The estimation of the gaze direction may be based on computer-based image analysis of features of the imaged eye. One known example method of eye tracking includes the use of infrared light and an image sensor. The infrared light is directed towards eye(s) of a user and the reflection of the light is captured by an image sensor.

Eye tracking systems may be provided in a head-mounted device, such as a virtual or augmented reality (VR or AR) device or VR or AR glasses or anything related, such as extended reality (XR) or mixed reality (MR) headsets. In such systems a pose (position and orientation) of a user's head is substantially fixed in relation to image sensors or cameras of the eye-tracking systems.

Eye tracking systems may also be provided as remote eye-tracking systems in which the image sensors are not always fixed relative to the pose of the head. Such systems may be used in conjunction with computing devices (e.g., laptops, desktops, tablets, etc.).

Remote eye-tracking systems may implement one or more algorithms for detecting the pose of the user's head. This is in addition to one or more algorithms that determine the gaze direction of the user.

SUMMARY

According to a first aspect of the disclosure, there is provided a method of operating an eye tracking system to present a portion of displayable content to a user on a display screen, wherein the displayable content covers a range of relative angles, and wherein the method comprises:
  receiving a head-pose-signal that represents an angle of the user's head relative to the display screen;
  receiving a gaze-signal that represents a position on the display screen that intersects with a gaze direction of the user;
  using the head-pose-signal to determine a sub-range of the relative angles of the displayable content;
  causing the display screen to present a portion of the displayable content to the user based on the determined sub-range of relative angles; and
  upon detecting that the gaze-signal represents a trigger location on the display screen:
    calculating a glance-induced offset based on the position of the trigger location;
    applying the glance-induced offset to the determined sub-range of relative angles to calculate an offsetted-sub-range of relative angles; and
    causing the display screen to present a portion of the displayable content to the user based on the calculated offsetted-sub-range of relative angles.

Such a method can advantageously use eye tracking to trigger a change in the presented content in a way that is considered equivalent to glancing. This means that the eye tracking system can detect the eye's natural glancing function to trigger in-game glancing; i.e., to reveal displayable content that is initially outside the boundaries of the display screen.

The method may further comprise:
  comparing the gaze-signal with one or more trigger zones associated with the display screen, and detecting that the gaze-signal represents a trigger location when the gaze signal represents a location in the one or more trigger zones.

The trigger zone may represent a region at the periphery of the display screen.

The method may further comprise: setting the size of the glance-induced offset based on the head-pose-signal.

Causing the display screen to present the portion of the displayable content to the user based on the calculated offsetted-sub-range of relative angles may comprise:
  transitioning from presenting the portion of displayable content based on the determined sub-range of relative angles to presenting the portion of the displayable content based on the calculated offsetted-sub-range of relative angles at an image transition rate that is faster than an image transition rate for changing the portion of displayable content that is based solely on the head-pose-signal.

Causing the display screen to present the portion of the displayable content to the user based on the calculated offsetted-sub-range of relative angles may comprise:
  transitioning from presenting the portion of displayable content based on the determined sub-range of relative angles to presenting the portion of the displayable content based on the calculated offsetted-sub-range of relative angles accompanied by presenting a motion effect on the display screen.

Subsequent to detecting that the gaze-signal represents the trigger location on the display screen, and upon detecting that the gaze-signal represents a release location on the display screen, the method may comprise:
  causing the display screen to present the portion of the displayable content that is based on the determined sub-range of relative angles.

The method may further comprise:
  comparing the gaze-signal with one or more release zones associated with the display screen, and detecting that the gaze-signal represents a release location when the gaze signal represents a location in the one or more release zones.

Subsequent to detecting that the gaze-signal represents the trigger location on the display screen, the method may comprise repeatedly:
  using the head-pose-signal to determine an updated offsetted-sub-range of relative angles of the displayable content; and
  causing the display screen to present a portion of the displayable content to the user based on the determined updated offsetted-sub-range of relative angles.

Subsequent to detecting that the gaze-signal represents the trigger location on the display screen, the method may comprise repeatedly:
using the head-pose-signal to determine the locations of one or more release zones on the display screen;
comparing the gaze-signal with the one or more release zones on the display screen; and
in response to detecting that the gaze-signal represents a release location when the gaze signal represents a location in the one or more release zones, causing the display screen to present the portion of the displayable content that is based on the determined sub-range of relative angles.

Using the head-pose-signal to determine the locations of one or more release zones on the display screen may comprise assigning a new location for one or more of the release zones that is spaced apart from its previous location in the opposite direction to a movement of the head as determined by the head-pose-signal.

Subsequent to detecting that the gaze-signal represents a trigger location on the display screen, the method may comprise repeatedly performing the following steps until the gaze-signal represents a release location on the display screen:
identifying a change in the head-pose-signal;
determining an updated sub-range of the relative angles of the displayable content based on the head-pose-signal;
applying the glance-induced offset to the updated sub-range of relative angles to calculate an updated offsetted-sub-range of relative angles; and
causing the display screen to present a portion of the displayable content to the user based on the calculated updated offsetted-sub-range of relative angles.

The displayable content may covers a first range of relative angles in a first dimension and a second range of relative angles in a second dimension. The method may comprise:
using the head-pose-signal to determine: a first sub-range of the relative angles of the displayable content in the first dimension; and a second sub-range of the relative angles of the displayable content in the second dimension; and
upon detecting that the gaze-signal represents the trigger location on the display screen, the method comprises:
calculating a glance-induced offset angle based on the position of the trigger location in relation to a substantially central region of the display screen; and
determining a two-dimensional glance-induced offset value based on the glance-induced offset angle;
applying the two-dimensional glance-induced offset value to the determined first and second sub-range of relative angles to calculate respective first and second offsetted-sub-ranges of relative angles; and
causing the display screen to present a portion of the displayable content to the user based on the calculated first and second offsetted-sub-ranges of relative angles.

The method may comprise repeatedly performing the following steps until the gaze-signal represents a release location on the display screen:
identifying a change in the gaze-signal;
calculating an updated glance-induced offset angle based on the gaze-signal in relation to the central region of the display screen;
determining an updated two-dimensional glance-induced offset value based on the updated glance-induced offset angle;
applying the two-dimensional glance-induced offset value to the determined first and second sub-range of relative angles to calculate respective first and second updated offsetted-sub-ranges of relative angles; and
causing the display screen to present a portion of the displayable content to the user based on the calculated first and second updated offsetted-sub-ranges of relative angles.

The method may further comprise repeatedly performing the following steps until the gaze-signal represents a release location on the display screen:
identifying a change in the gaze-signal;
if the changed gaze-signal represents a trigger location, then:
calculating an updated glance-induced offset angle based on the gaze-signal in relation to the central region of the display screen;
determining an updated two-dimensional glance-induced offset value based on the updated glance-induced offset angle;
applying the two-dimensional glance-induced offset value to the determined first and second sub-range of relative angles to calculate respective first and second updated offsetted-sub-ranges of relative angles; and
causing the display screen to present a portion of the displayable content to the user based on the calculated first and second updated offsetted-sub-ranges of relative angles; and
if the changed gaze-signal does not represent a trigger location, then:
causing the display screen to continue to present the portion of the displayable content that is currently being displayed.

There is also disclosed an eye tracking system configured to perform any method disclosed herein.

There may be provided a computer program, which when run on a computer, causes the computer to configure any apparatus, including a controller, device or system disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Figure 1:
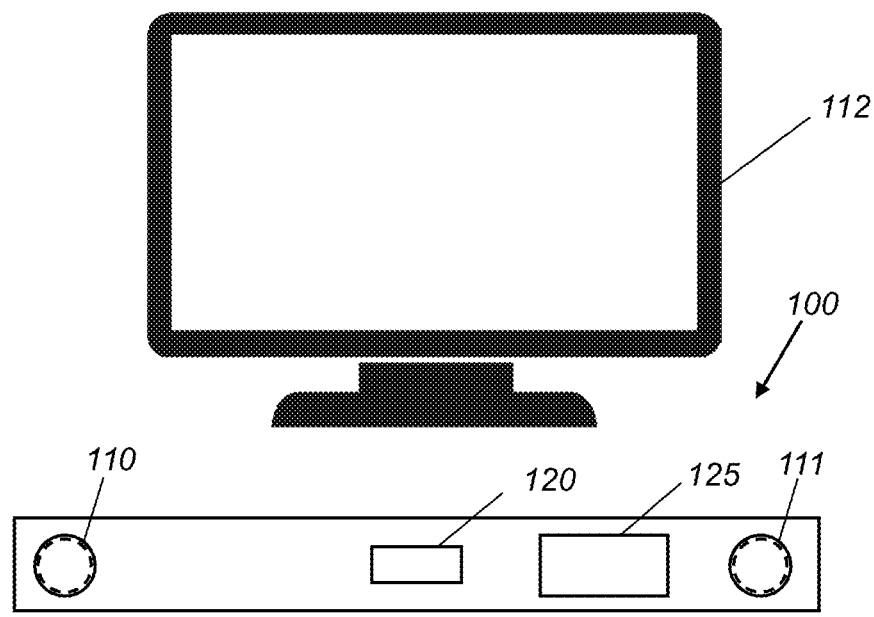
FIG. 1 shows a simplified view of an eye tracking system.

FIG. 1 shows a simplified view of an eye tracking system 100 (which may also be referred to as a gaze tracking system). The system 100 comprises an image sensor 120 (e.g., a camera) for capturing images of the eyes of the user. The system may include one or more sets of illuminators 110, 111 (also referred to as light sources) for illuminating the eyes of a user, which may for example be sets of light emitting diodes (LEDs) that emit light in the infrared frequency band or in the near infrared frequency band. The illuminators may be physically arranged in a variety of configurations. The image sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor may be capable of converting light into digital signals. In one or more examples, it could be an infrared image sensor or IR image sensor, an RGB sensor, an RGBW sensor or an RGB or RGBW sensor with IR filter.

The eye tracking system 100 also comprises one or more controllers 125 for receiving and processing the images captured by the image sensor 120. The controllers 125 may for example be connected to the image sensor 120 and the optional one or more sets of illuminators 110, 111 via a wired or a wireless connection and may or may not be co-located with the image sensor 120 and the one or more sets of illuminators 110, 111.

The eye tracking system 100 also includes a display screen 112 for presenting content and/or visual stimuli to the user.

Figure 2:
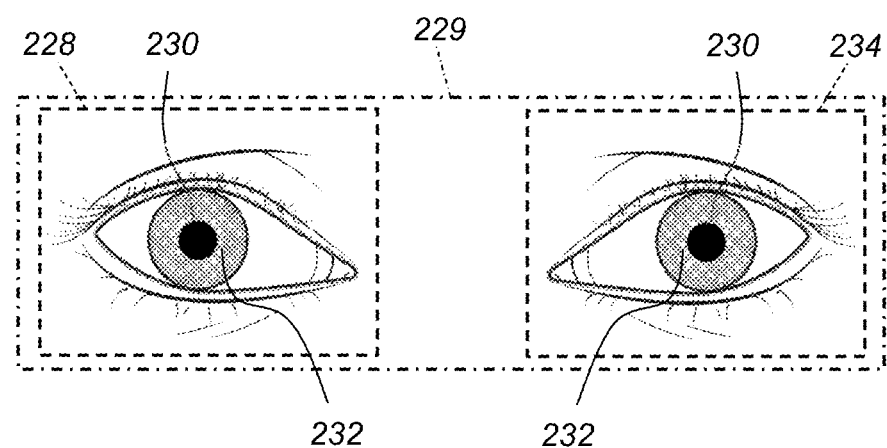
FIG. 2 shows a simplified example of an image of a pair of eyes, captured by an eye tracking system such as the system of FIG. 1.

FIG. 2 shows a simplified example of an image 229 of a pair of eyes, captured by an eye tracking system such as the system of FIG. 1. The image 229 can be considered as including a right-eye-image 228, of a person's right eye, and a left-eye-image 234, of the person's left eye. In this example the right-eye-image 228 and the left-eye-image 234 are both parts of a larger image of both of the person's eyes. In other examples, separate image sensors may be used to acquire the right-eye-image 228 and the left-eye-image 234. In further still examples, multiple image sensors may be used to acquire images capturing both eyes.

The system may employ image processing (such as digital image processing) for extracting features in the image. The system may for example identify a position of the pupil 230 in the one or more images captured by the image sensor. The system may determine the position of the pupil 230 using a pupil detection process. The system may also identify corneal reflections (also known as glints) 232 located in close proximity to the pupil 230. The system may estimate a corneal centre and/or a distance to the user's eye based on the corneal reflections 232. For example, the system may match each of the individual corneal reflections 232 for each eye with a corresponding illuminator and determine the corneal centre of each eye and/or the distance to the user's eye based on the matching. To a first approximation, the eye tracking system may determine an optical axis of the eye of the user as the vector passing through a centre of the pupil 230 and the corneal centre. The direction of gaze corresponds to the axis from the fovea of the eye through the corneal centre (visual axis). The angle between the optical axis and the gaze direction is the foveal offset, which typically varies from user to user and is in the range of a few degrees. The eye tracking system may perform a calibration procedure, instructing the user to gaze in a series of predetermined directions (e.g., via instructions on a screen), to determine the fovea offset. The determination of the optical axis described above is known to those skilled in the art and often referred to as pupil centre corneal reflection (PCCR). PCCR is not discussed in further detail here.

One or more of the following examples relate to eye tracking systems that improve the ability of a user to select a portion of displayable content that is to be presented on a display screen. Such examples can be particularly well-suited to gaming applications where there can be a large amount of game world content, but only some of which can be presented to the user on the display screen at any one time.

A key objective for gaming is to make it believable that the gamer is inside the game. If it is a first-person perspective game, then the game studio wants the gamer to have a first-hand experience. The most common way that game studios try to create believability of the gamer being there in the game is to add the possibility of looking around in the game by adding what is commonly known as an in-game camera, which operates separately from the pointing direction of the avatar body/vehicle/plane/etc., thus giving the impression of turning one's head when driving a racing car, flying a plane, or running around in real life.

In third person perspective games, the gamer takes more of an assisting role to the avatar body/vehicle/plane/etc., (this could be seen as the equivalent of a person in real life driving a remote-controlled car, controlling the car and observing at the same time). But even here the attempt is to give the assistant (the gamer) a first-person experience, simulating that the gamer is observing from inside the game rather than from the other side of the display screen.

Virtual reality (VR) has become successful in recent years in providing an immersive experience for the user. The reason VR gives such great immersive experiences in-game is because the displays are placed directly in front of each eye (like wearing glasses), thus making the user believe that what they see on the mini displays is real because it gives the viewer a sense of seeing depth (3D). Another reason is that everything outside of the game is blocked out (the user only sees game content, not things outside). The size of the displays also enables gamers to glance at things that are next to objects that are in the focal point, hence real-life glancing can be achieved. So, by combining head & body rotation (as VR headsets can detect any axial movement) with eye glancing, looking around in games in VR becomes like looking in real life.

Having said this, VR still has some drawbacks. These can include: weight of the headset (many gamers can play for many hours and the weight becomes an issue); motion sickness issues; cost of purchase and other reasons. Therefore, a significant proportion of the gaming community still prefer to play with personal computer (PC) display screens or console screens, which can have an aspect ratio of 16:9 or 16:10, for example. This means that the gamer will have a screen placed in front of the gamer at some distance, such that the field of view of the user will drastically be reduced (compared with what the user would see in real life).

One method for enabling a user to look around in a game is known as mouse look. This entails temporarily allowing the mouse (which is normally used for controlling the crosshair aiming in certain types of games) to control the in-game camera by key-binding. This means that if the gamer presses the bound key, the mouse control switches over to controlling the in-game camera for as long as the key is pressed. Upon release, the mouse switches back to controlling the crosshair aiming. This method can be cumbersome and does not feel natural. Also, this method is hard to combine with joystick or game pad controllers as there are a limited number of keys that are already reserved for other functions.

Another method for enabling a user to look around in a game involves controlling the in-game camera using a head tracker, which can feel more natural than the mouse look that is described above. For this method, when the gamer rotates his/her head (in any one or more of a yaw, pitch and roll direction), the in-game camera rotates in the corresponding direction. However, when head tracking is used to control a corresponding movement of the in-game camera, the fact that the gaming display screen is placed in front of the gamer must be accounted for because it restricts how much the gamer can rotate his/her head before losing sight of the screen. Also, turning too far can induce discomfort both for the gamer's neck and eyes. Since gamers can spend many hours gaming, this becomes a real issue and therefore can decrease the willingness of a gamer to use a head tracker.

Furthermore, in some games the task of a head tracker is to achieve an in-game camera movement of up to 360 degrees in yaw (180 degrees left and right), and up to 180 degrees in pitch (90 degrees up and down) from a head rotation of just a fraction of the mentioned angles (e.g., 15-30 degrees in any direction). This means that the sensitivity to achieve this range of motion needs to be set extremely high as a few degrees of head rotation (required by the gamer looking at a screen) needs to represent the wide in-game viewing angles. This higher sensitivity setting can reduce the gaming experience, can induce nausea, and can make the game hard to play. Lowering the sensitivity can counter nausea and can improve the game play experience, but at the cost of lower viewing angles such that the gamer can no longer look behind or look up far enough.

The examples that will be described below can achieve in-game camera control in positive and negative directions in yaw (180 degrees) and pitch (90 degrees), without requiring a head-pose sensitivity that ruins the forward-looking gaming experience. To give screen-based gamers a near VR like experience and to access game content that lies just outside the borders of the display screen (as one would expect in real life viewing), we utilize in-game "enhanced reality experience." This is in combination with allowing gamers to look around using head tracking. As will be discussed in detail below, "enhanced reality experience" resembles real life glancing where the gamer uses their eyes to look at objects in the peripheral viewing zones to mimic how, in real life, people use their eyes and head rotation in combination to more efficiently look around, especially if they want to look behind. Therefore, by combining head tracking, eye tracking and software features for controlling an in-game viewing camera, the examples described herein provide a gaming experience of looking around in games that resembles how we look around in real life, where we already use our eyes and turn our heads.

Figure 3:
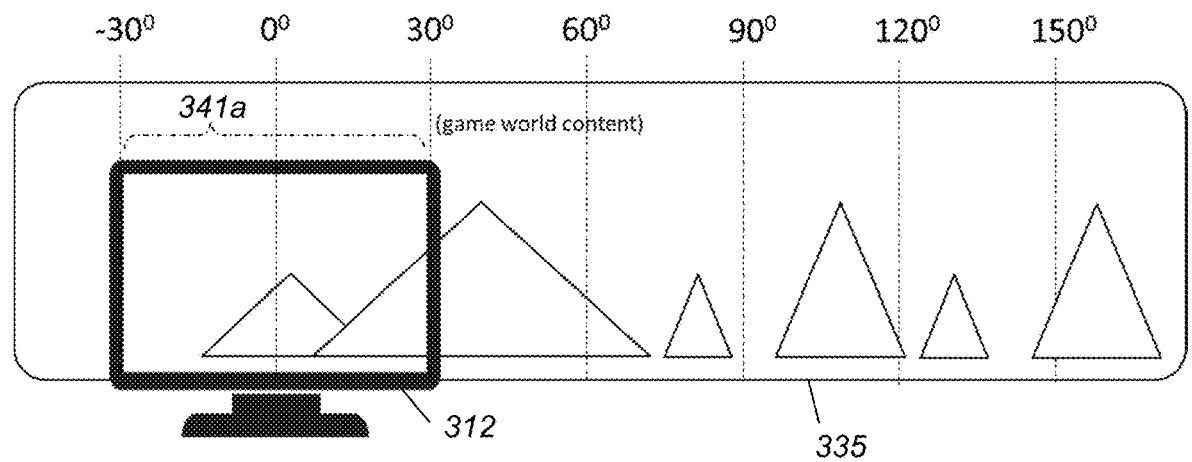
FIG. 3 shows an example of displayable content, a portion of which can be presented to a user on a display screen.

FIG. 3 shows an example of displayable content 335, a portion of which can be presented to a user on a display screen 312. As shown in FIG. 3, the displayable content covers a range of relative angles. For ease of illustration, a range of relative angles in only a single dimension (a horizontal dimension) is labelled in FIG. 3. However, it will be appreciated that there could also be a corresponding range of relative angles in a second dimension (e.g., a vertical dimension). The range of relative angles that is shown in FIG. 3 extends between about −45° and +165°. However, it will be appreciated that in many applications, the range of relative angles in the horizontal dimension will extend between −180° and +180°. Similarly, the range of relative angles in a vertical dimension can extend between −90° and +90°.

In FIG. 3, a display screen 312 is located over the displayable content 335. The boundary of the display screen 312 defines a sub-range 341a of the relative angles of the displayable content 335 that is presented to the user on the display screen 312. For the illustration of FIG. 3, the sub-range 341a of relative angles is −30° to +30°.

Figure 4:
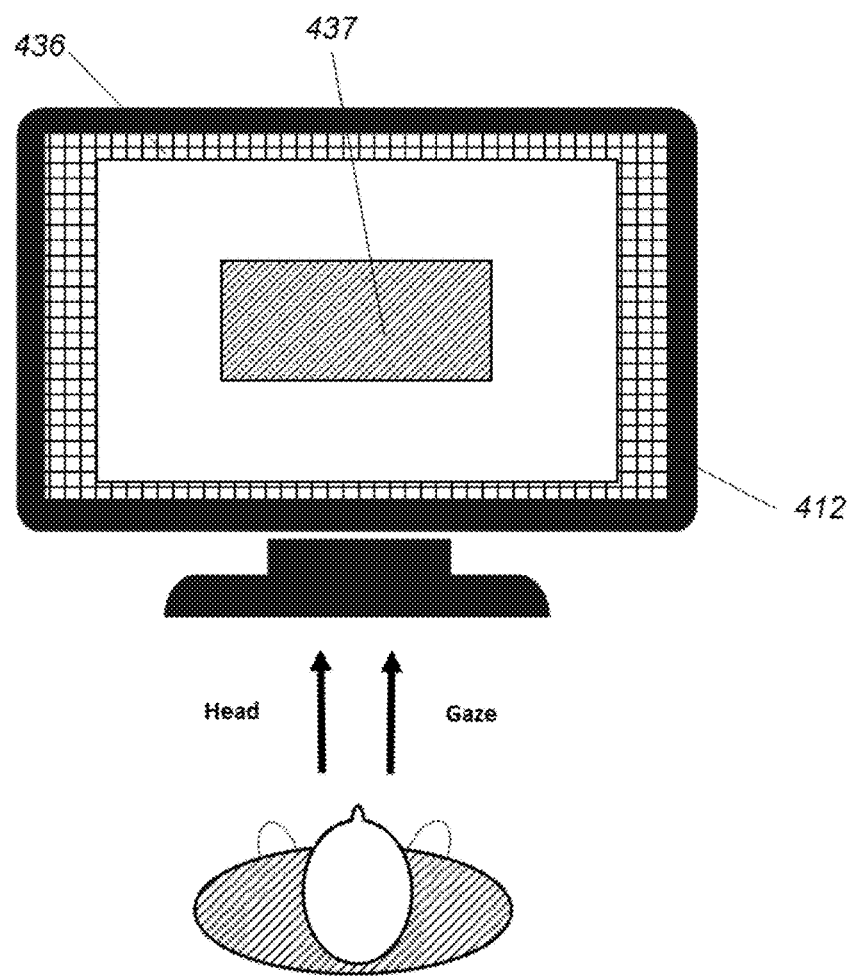
FIG. 4 shows an example of information that can be presented on a display screen, along with an associated trigger zone and an associated release zone.

FIG. 4 shows an example of information that can be presented on a display screen 412, along with an associated trigger zone 436 and an associated release zone 437. As will be appreciated from the description that follows, the trigger zone 436 and the release zone 437 need not necessarily be identified to the user on the display screen 412. Instead, they can be regions of the display screen 412 that are demarcated as the corresponding zones, yet they are presented as the corresponding portions of the displayable content without any visual modification. In another example, the trigger zone 436 and the release zone 437 can be identified to the user by modifying the displayable content in those regions, for example by increasing or decreasing the brightness of the content in those regions.

In this example, the trigger zone 436 represents a region at the periphery of the display screen 412, which extends around the perimeter of the display screen 412. Although it will be appreciated that the trigger zone 436 can be provided at any suitable location on the display screen 412, which can include: one or more non-contiguous regions that extend around some, but not all, of the periphery of the display screen 412; and/or one or more non-contiguous regions that are not at the periphery of the display screen 412.

In this example, the release zone 437 represents an inner region of the display screen 412, which is spaced apart from the trigger zone 436. However, it will be appreciated that the release zone 437 can be provided at any suitable location on the display screen 412, which can again include one or more non-contiguous regions.

Figure 5A:
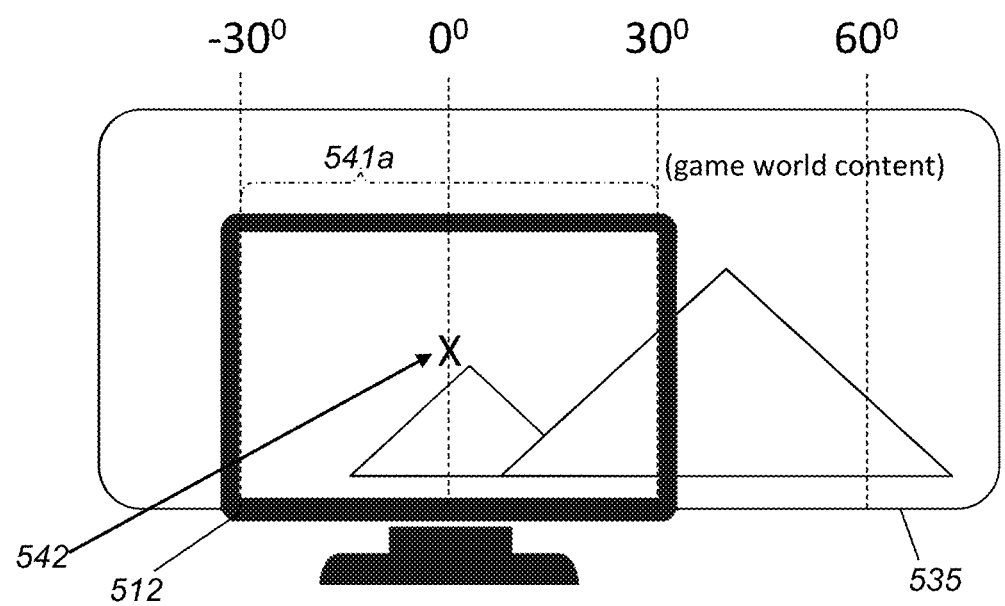
FIGS. 5a-5c illustrate schematically how an eye tracking system according to an example embodiment of the present disclosure enables a user to control what portion of displayable content is presented on a display screen.
Figure 5A:
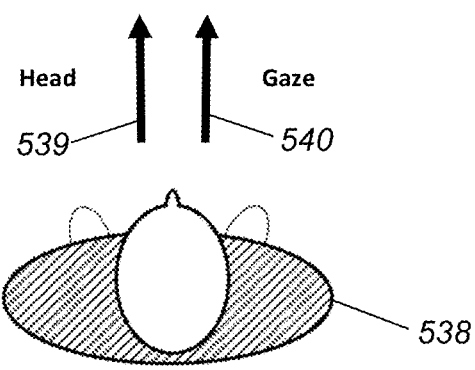
Figure 5B:
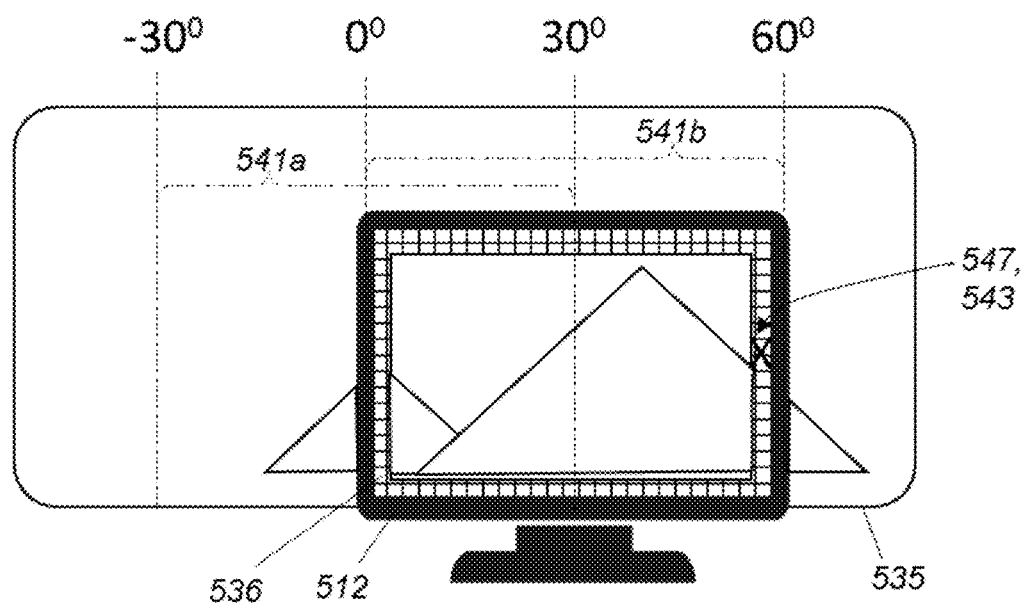
Figure 5B:
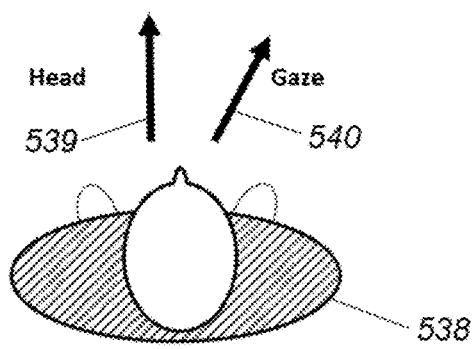
Figure 5C:
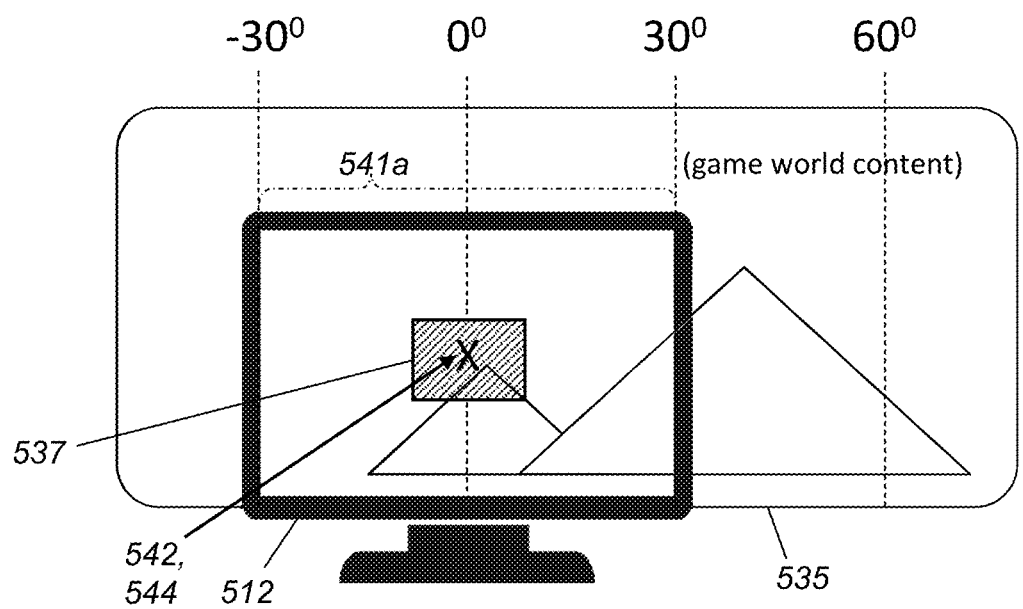
Figure 5C:
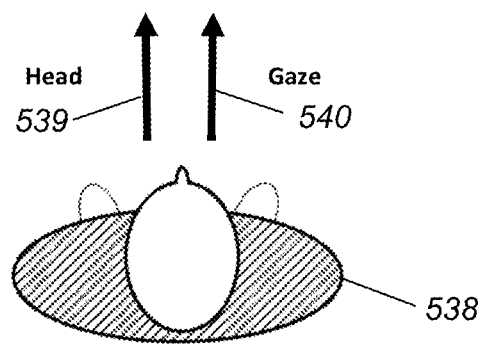

We will initially describe how the trigger zone 436 and the release zone 437 can be used with reference to FIGS. 5a-5c.

FIGS. 5a-5c illustrate schematically how an eye tracking system according to an example embodiment of the present disclosure enables a user 538 to control what portion of displayable content 535 is presented on a display screen 512.

In the same way that is described with reference to FIG. 3, the displayable content 535 in FIG. 5 covers a range of relative angles. In this example a range of about −40° to +75° is shown. Only a portion/subset of the displayable content 535 can be presented to the user 538 on the display screen 512 at any one time. This portion/subset of the displayable content 535 will be referred to as a sub-range 541a of the relative angles of the displayable content 535.

In each of FIGS. 5a-5c, the angle of the user's head relative to the display screen 512 is illustrated as a head pose arrow 539. As is known in the art, a head tracking system can provide a head-pose-signal that represents the angle of the user's head relative to the display screen 512. Also, the gaze direction of the user is illustrated as a gaze direction arrow 540, and the associated position on the display screen 512 that intersects with the gaze direction of the user is identified in the drawings with an 'X' 542. As is known in the art, an eye tracking system can provide a gaze-signal that represents the position 542 on the display screen 512 that intersects with the gaze direction of the user.

It will be appreciated that any known systems and methods for determining a user's gaze direction and head pose can be used to provide the associated information that is represented by the head pose arrow 539 and the gaze direction arrow 540.

In the example of FIGS. 5a-5c, for convenience we will describe how the user 538 can change which portion of the displayable content 535 is presented on the display screen 512 in only one dimension (the horizontal dimension). However, it will be appreciated that the functionality can be readily expanded to include a second dimension; i.e. the vertical dimension for FIGS. 5a-5c.

In FIG. 5a, as illustrated by the head pose arrow 539, the head-pose-signal represents an angle of 0° of the user's head relative to the display screen 512. That is, the user's head is facing straight towards the display screen 512. The eye tracking system uses the head-pose-signal to determine the sub-range 541a of the relative angles of the displayable content 535 that are presented on the display screen 512, and then causes the display screen 512 to present a portion of the displayable content 535 to the user 538 based on the determined sub-range 514a of relative angles. In this example, since the head-pose-signal represents 0°, the sub-range 541a of the relative angles of the displayable content 535 is centred around the 0° part of the displayable content 535. The dimensions of the display screen 512 in this example dictate that the magnitude of the sub-range 541a of the relative angles is 60°, and therefore the sub-range 541a of the relative angles is between −30° and +30°.

In FIG. 5a, as illustrated by the gaze direction arrow 540, the gaze-signal represents a position, 'X', 542 in the middle of the display screen 512. This is the position on the display screen 512 that intersects with the gaze direction of the user. Therefore, the user 538 is looking at the centre of the display screen 512 in FIG. 5a.

Turning now to FIG. 5b, and as illustrated by the gaze direction arrow 540, the gaze-signal now represents a position, 'X', 542 that is in the right-hand side of the display screen 512. That is, the user 538 is looking at the right-hand side of the display screen 512. Furthermore, the gaze-signal represents a trigger location 543 on the display screen 512 because the gaze point, 'X', 542 is in a trigger zone 536. To detect this, the eye tracking system can compare the gaze-signal with one or more trigger zones 536 on the display screen 512, and then detect that the gaze-signal represents a trigger location 543 when the gaze signal represents a location in the one or more trigger zones 536.

Upon detecting that the gaze-signal represents a trigger location 543 on the display screen 512, the eye tracking system calculates a glance-induced offset based on the position of the trigger location 543. In this example, the trigger location 543 is on the right-hand side of the display screen 512, and therefore a glance-induced offset is calculated that will result in the portion of the displayable content 535 that is presented on the display screen 512 being shifted to the right. In FIG. 5b, the glance-induced offset that has been applied is +300. The eye tracking system then applies the glance-induced offset to the determined sub-range 541a of relative angles (as determined by the user's head pose, as described with reference to FIG. 5a) to calculate an offsetted-sub-range 541b of relative angles. In FIG. 5b, the sub-range 541a of relative angles (as determined by the user's head pose) is 0°, and the glance-induced offset is +30°. Therefore, the offsetted-sub-range 541b of relative angles is centered around +30°. The eye tracking system then causes the display screen 512 to present a portion of the displayable content to the user based on the calculated offsetted-sub-range 541b of relative angles.

In this way, eye tracking is used to trigger a change in the presented content in a way that is considered equivalent to glancing. This means that the eye tracking system can detect the eye's natural glancing function to trigger in-game glancing; i.e., to reveal displayable content 535 (such as in-game content) that is initially outside the boundaries of the display screen 512.

Furthermore, in this example the application of the glance-induced offset to cause the change in the portion of the displayable content 535 that is presented on the display screen 512 can be performed relatively quickly. This is to mimic a "ballistic eye movement" or a "saccadic eye movement," which are terms that are known in the art. This functionality can be implemented by the eye tracking system to transition from presenting the portion of displayable content based on the determined sub-range 541a of relative angles (i.e., before the glance was triggered) to presenting the portion of the displayable content based on the calculated offsetted-sub-range 541b of relative angles at an image transition rate (i.e., after the glance was triggered), which is faster than an image transition rate for changing the portion of displayable content that is based solely on the head-pose-signal. That is, the rate of change of relative angle of the displayable content 535 with respect to time when applying a glance-induced offset can be greater than the maximum rate of change of relative angle of the displayable content 535 when updating the sub-range 541a of the relative angles based on the head-pose-signal. By way of non-limiting examples, the transition between presenting the portion of displayable content based on the determined sub-range 541a of relative angles to presenting the portion of the displayable content based on the calculated offsetted-sub-range 541b of relative angles may occur in less than 1 second, less than 0.5 second, less than 0.25 seconds, or less than 0.1 seconds. This can include a period of accelerating the rate of change of what portion of the displayable content is presented at the start of the transition and a period of decelerating the rate of change of what portion of the displayable content is presented at the end of the transition, as will be discussed below. In this way, the system can mimic how a person glances to one side, or up or down, (i.e., they shift their gaze direction very quickly) in order to look at something in their peripheral vision. Such eye glances may peak at about 700 degrees per second, for example.

Turning now to FIG. 5c, and as illustrated by the gaze direction arrow 540, the gaze-signal now represents a position, 'X', 542 that is back in the middle of the display screen 512. That is, the user 538 is again looking at the centre of the display screen 512. In FIG. 5c, the gaze-signal represents a release location 544 on the display screen 512 because the gaze point, 'X', 542 is in a release zone 537. That is, the eye tracking system can compare the gaze-signal with one or more release zones 537 on the display screen 512, and can detect that the gaze-signal represents a release location 544 when the gaze signal represents a location in the one or more release zones 537.

Subsequent to detecting that the gaze-signal represents the trigger location 543 on the display screen 512 (as shown in FIG. 5b), and upon detecting that the gaze-signal represents a release location 544 on the display screen 512 (as shown in FIG. 5c), the eye tracking system causes the display screen 512 to present the portion of the displayable content that is based on the determined sub-range 541a of relative angles. That is, the eye tracking system removes the glance-induced offset such that the user 538 is presented with a portion of the displayable content 535 that is based solely on the head-pose-signal, which represents the angle of the user's head relative to the display screen 512.

This transition from the portion of displayable content with the glance-induced offset applied (as shown in FIG. 5b) to the portion of displayable content with the glance-induced offset removed (as shown in FIG. 5c) can also be performed relatively quickly, in the same way that is described above for the transition in the opposite direction between the portions of displayable content that are shown in FIGS. 5a and 5b.

Furthermore, either of these transitions can be accompanied by presenting a motion effect on the display screen. For example, a sequence of portions of the displayable 535 can be presented on the display screen 512 in the transition from the starting portion to the end portion, wherein the intermediate portions in the sequence represent portions of the displayable content that are located between the starting portion and the end portion. An example of a motion effect is a variation in the effective speed with which the sequence of portions of the displayable content are presented to the user during the transition. This can include: i) an apparent increase in the speed at the start of the transition; and/or ii) an apparent decrease in the speed at the end of the transition. This can be implemented by changing the refresh rate at which the different portions are presented on the display screen and/or it can be implemented by varying the angular difference between adjacent portions of the displayable content in the sequence. Either way, the user can perceive a gradual increase in the speed of the transition at the start of the transition and/or a gradual decrease in the speed of the transition at the end of the transition.

Adding a start and stop animation (sometimes known as motion effect) to the in-game camera movement in this way can further improve the user's immersion. An animation break threshold parameter can be used that sets how much of the in-game camera traversing distance should be affected by any added start and stop motion effects. This feature helps the gamer to understand that the in-game camera is starting to move or is coming to a halt. This, in turn, can counteract nausea and motion sickness effects because the user experiences more predictive in-game camera movements. In addition, this functionality can aid the user in finding their whereabouts when releasing the glance; otherwise, for some users a ballistic movement of the in-game camera (a simulated saccade) can be disorientating.

Another way of considering this functionality is the addition of in-game camera motion that is defined by a trigger movement time parameter. Such a time parameter defines the time taken for the in-game camera to traverse from standstill to the final glance angle. This can also apply for releasing the glance, such that it uses a release movement time parameter to define how long it will take for the in-game camera to traverse back from the glance angle to zero degrees (or whatever angle is defined by the head-pose-signal).

In some examples, head tracking can continue after a glance has been triggered such that the portion of displayable content continues to be updated based on the angle of the user's head relative to the display screen 512. This can be implemented by repeatedly performing the following steps until the gaze-signal represents a release location on the display screen:
  identifying a change in the head-pose-signal;
  determining an updated sub-range of the relative angles of the displayable content based on the head-pose-signal;
  applying the glance-induced offset to the updated sub-range of relative angles to calculate an updated offsetted-sub-range of relative angles; and
  causing the display screen to present a portion of the displayable content to the user based on the calculated updated offsetted-sub-range of relative angles.

As an extension to the functionality of the eye tracking system that is described with reference to FIGS. 5a-5c, the system can set the size of the glance-induced offset based on the head-pose-signal. For example, as the angle of the user's head relative to the display screen gets further away from zero, the size of the glance-induced offset can increase.

In FIGS. 5a-5c, the user is facing straight ahead and a glance-induced offset angle of 30° is applied. This is an example of a base glance angle/distance, which is the starting angle/distance that defines how far the in-game camera will traverse when a glance is triggered with the user looking forward. This means that a glance trigger when the gamer is looking forward (with a zero degrees adjustment to which portion of the displayable content is presented based on the associated head-pose-signal) results in an in-game camera traversal of 30 degrees—i.e., the forward-looking of zero degrees plus the base glance distance of 30 degrees.

Figure 6A:
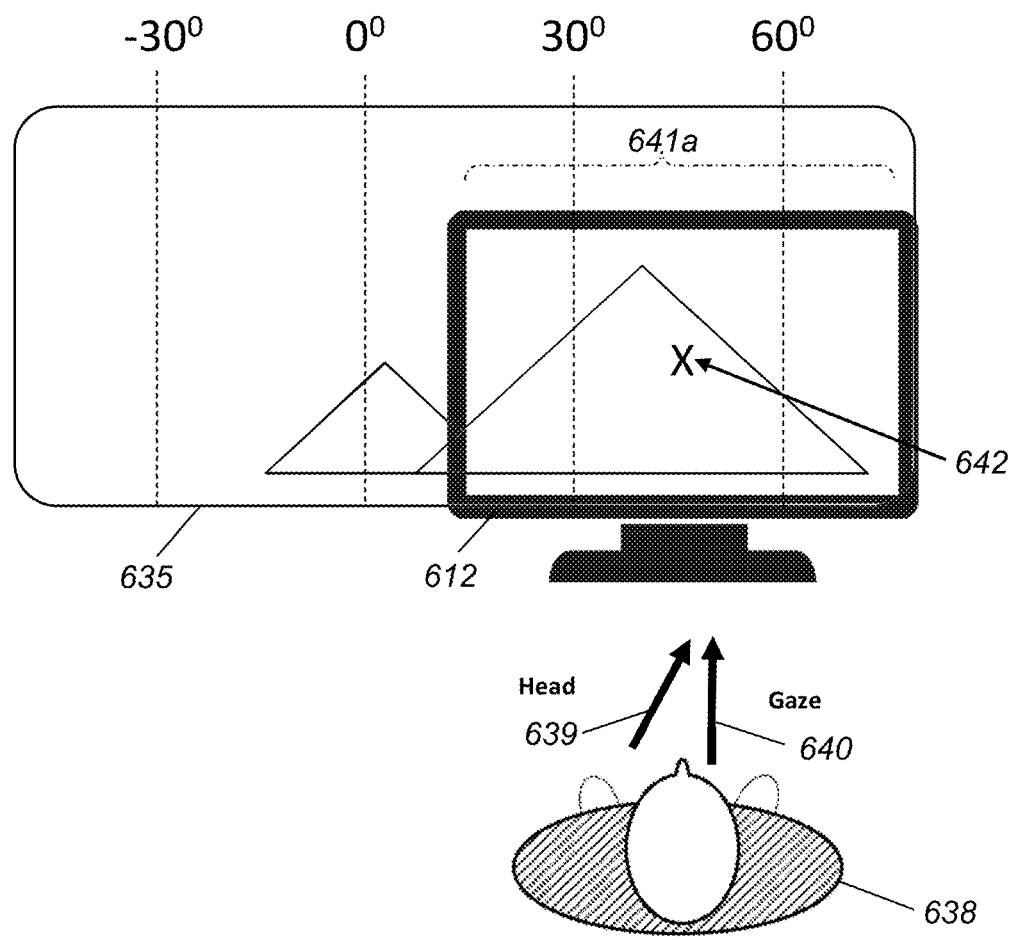
FIGS. 6a and 6b illustrate how a different glance-induced offset value can be used when the user's head is not looking straight forwards.
Figure 6B:
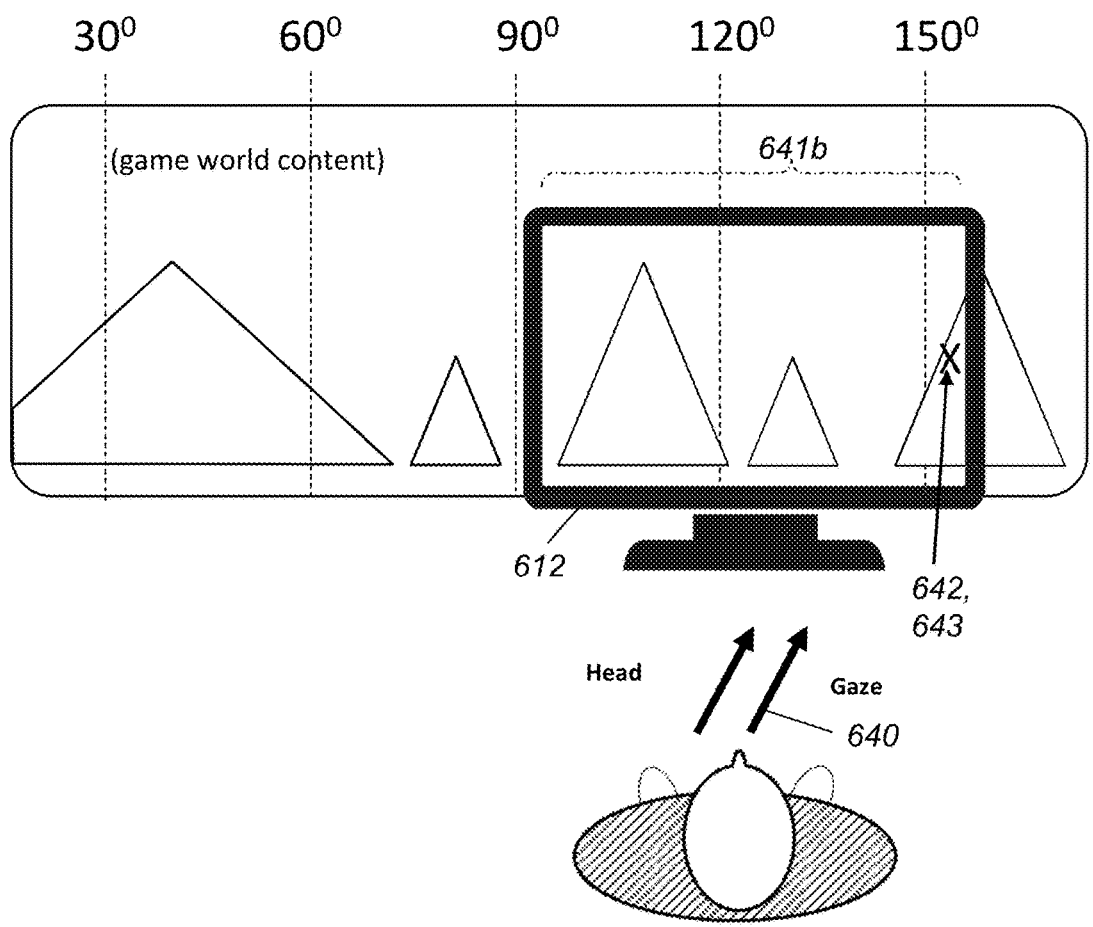

FIGS. 6a and 6b illustrate how a different glance-induced offset value can be used when the user's head is not looking straight forwards.

In FIG. 6a, as schematically illustrated by the head pose arrow 639, the head-pose-signal represents an angle of 25° of the user's head relative to the display screen 612. The eye tracking system uses the head-pose-signal to determine the sub-range 641a of the relative angles of the displayable content 635 that are presented on the display screen 612, and then causes the display screen 612 to present a portion of the displayable content 635 to the user 638 based on the determined sub-range 641*a* of relative angles. In this example, a scaling factor 2:1 is applied to the head-pose-signal in order to determine the centre of the determined sub-range 614*a* of relative angles. Therefore, the head-pose-signal of 25° results in a determined sub-range 614*a* of relative angles that is centred on 50°.

In FIG. 6*a*, as illustrated by the gaze direction arrow 640, the gaze-signal represents a position, 'X', 642 in the middle of the display screen 612.

Turning now to FIG. 6*b*, and as illustrated by the gaze direction arrow 640, the gaze-signal now represents a gaze point at a position, 'X', 642 that is in the right-hand side of the display screen 612. Although not shown in FIG. 6*b*, the gaze point, 'X' 642 is at a location in a trigger zone, and therefore it is detected as a trigger location 643.

Upon detecting that the gaze-signal represents a trigger location 643 on the display screen 612, the eye tracking system calculates a glance-induced offset based on the position of the trigger location 643 and also based on the head-pose-signal. In this example, the trigger location 643 is on the right-hand side of the display screen 612, and therefore a glance-induced offset is calculated that will result in the portion of the displayable content 635 that is presented on the display screen 612 being shifted to the right. That is, the eye tracking system determines that the glance-induced offset should have a positive value so that the glance-induced offset is applied in the correct direction.

In the example of FIG. 6*b*, the magnitude of the glance-induced offset is three times larger than the angle of the user's head relative to the display screen, as defined by the head-pose-signal. Since this angle is 25° in this example, the magnitude of the glance-induced offset is 75°. Therefore, the sub-range 641*a* of relative angles (as determined by the user's head pose) is 50° and the glance-induced offset is +75°, such that the offsetted-sub-range 641*b* of relative angles is centred around +125°.

This can be considered as implementing an extended glance distance. A maximum value of the extended glance distance can be applied such that the user is able to view displayable content at a relative angle of 180°, i.e., directly behind them. In one example, a maximum value for the angle of the user's head relative to the display screen that can be detected can result in sub-range 641*a* of the relative angles of the displayable content 635 that is shifted by 90° relative to a starting point. When the head-pose-signal represents this maximum angle, the size of the glance-induced offset can be the additional 90° that is required to achieve a total angular shift of 180°.

Any head rotation angles between looking forward and looking sideways by the maximum amount can be used to set the glance-induced offset proportionally between the base and maximum glance angles.

This example can be considered as using eye tracking to trigger in-game glancing in combination with a dynamic glance angle, which is dependent on how much the user's head is rotated. Thereby controlling how far the in-game camera should rotate when a glance is triggered. This means that a simulation of how a user uses both their head and eyes in real life to achieve greater viewing angles can be achieved, thus catering for the fact that the user is always generally facing forward looking at the display screen. That is, a different glance-induced offset value can be used when the user's head is not looking straight forwards.

FIGS. 7*a* to 7*g* illustrate how an eye tracking system can be used that achieves a smooth pursuit on screen without unwanted releases. As will be discussed below, this can involve dynamically assigning a new location for one or more release zones so that the glance-induced offset is not removed prematurely such that the user can no longer see the content on the display screen that they are wanting to look at.

Figure 7A:
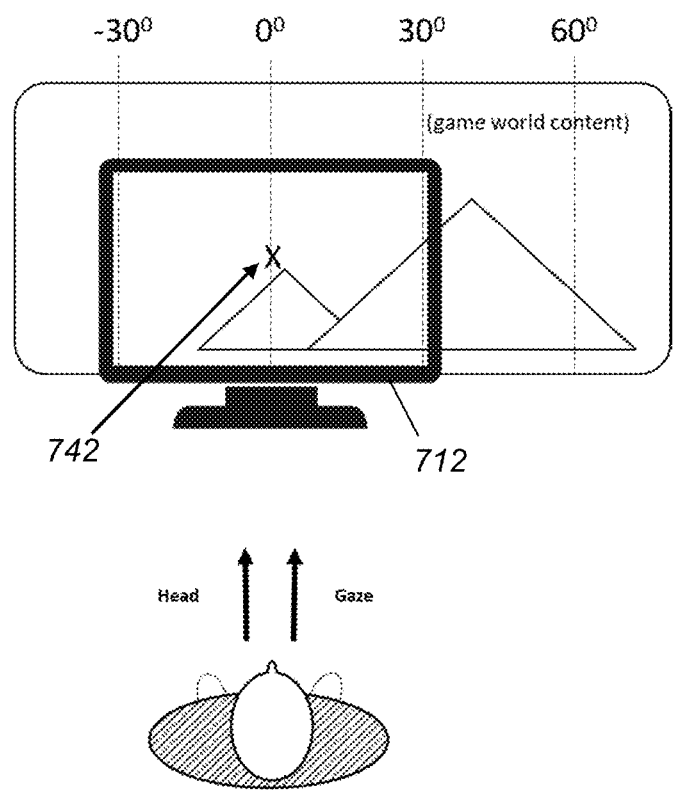
FIGS. 7a to 7g illustrate how an eye tracking system can be used to achieve smooth pursuit on screen without unwanted releases.

In FIG. 7*a*, as illustrated by the gaze direction arrow, the gaze-signal represents a position, 'X', 742 in the middle of the display screen 712. Also, as illustrated by the head pose arrow, the head-pose-signal represents an angle of 0° of the user's head relative to the display screen 712.

Figure 7B:
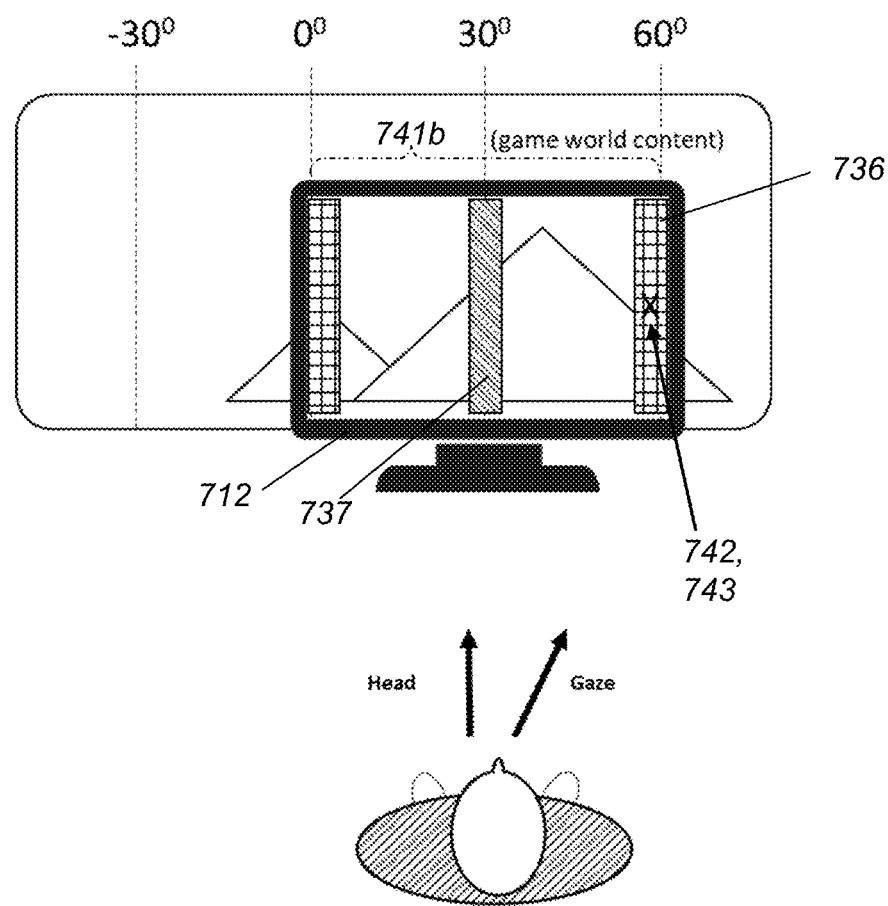

In FIG. 7*b*, as illustrated by the gaze direction arrow, the gaze-signal now represents a gaze point at position, 'X', 742, which is in a trigger zone 736. Therefore, the gaze point at position, 'X', 742 in FIG. 7*b* is a trigger location 743. This has caused a glance-induced offset of +30° to be applied such that the portion of the displayable content that is presented on the display screen 712, defined by an offsetted-sub-range 741*b* of relative angles, is centred at 30°. The release zone 737 is shown in a central region of the display screen 712.

Figure 7C:
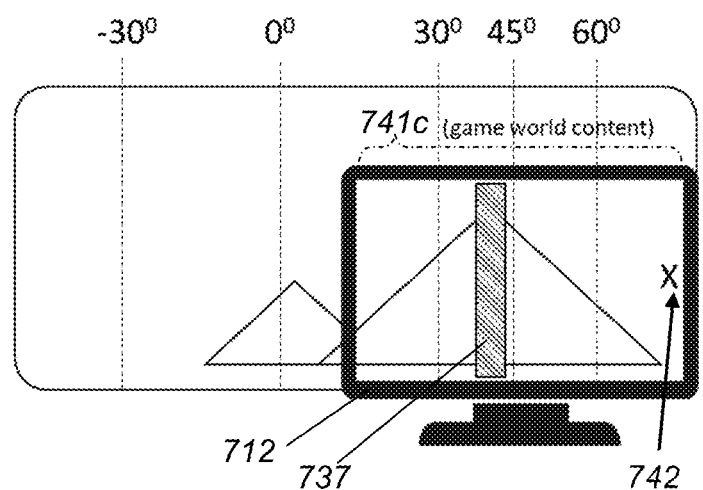
Figure 7C:
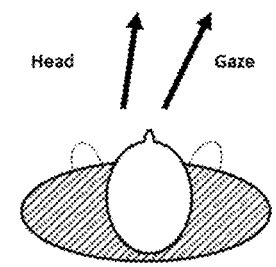

In FIG. 7*c*, the user starts to rotate their head to the right but their gaze direction, and therefore the gaze point 742, does not change. This change in the head-pose-signal, which represents the angle of the user's head relative to the display screen 712, causes the associated underlying sub-range of the relative angles of the displayable content (that is based on head angle) to increase by 15°. When this is combined with the glance-induced offset value of 30°, an updated offsetted-sub-range 741*c* of relative angles is centred on 45°. Another consequence of the change in head angle in this example is that the release zone 737 has been assigned a new location such that it is spaced apart its previous location in a direction that is to the left with reference to the boundaries of the display screen 712. That is, the release zone 737 has moved in the opposite direction to the change in head pose. This is also a movement away from the trigger location 743.

Figure 7D:
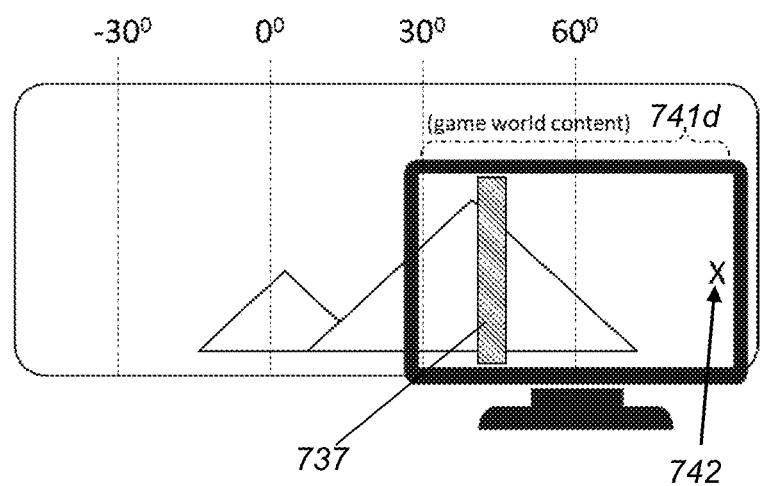
Figure 7D:
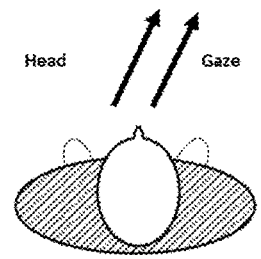

In FIG. 7*d*, the user continues to change the angle of their head to the right, but their gaze direction does not change. This change in the head-pose-signal causes the associated underlying sub-range of the relative angles of the displayable content (that is based on head angle) to increase further to 30°. When this is combined with the glance-induced offset value of 30°, an updated offsetted-sub-range 741*d* of relative angles is centred on 60°. Also, the release zone 737 has been assigned a new location that is further to the left.

Figure 7E:
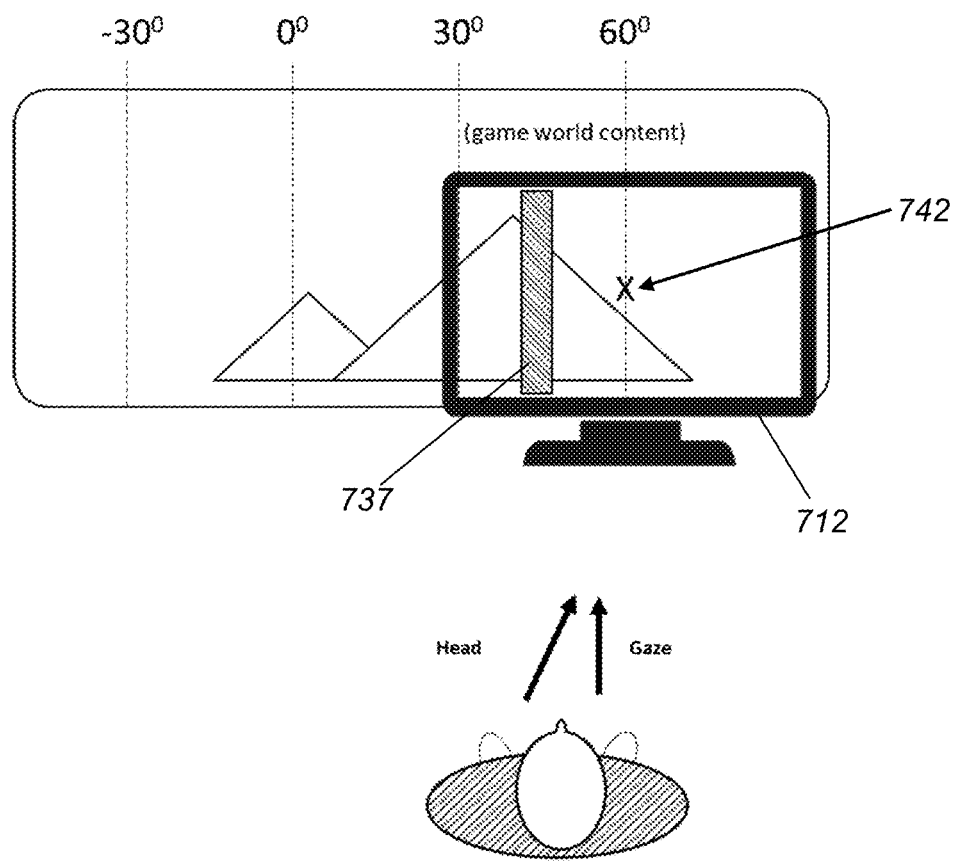

In FIG. 7*e*, the user has redirected their gaze back to the centre of the display screen 712, such that the gaze point 742 is located in a central region of the display screen 712. This may be because the application of the glance-induced offset of 30° to the right has brought the object that the user was looking for into the centre of the display screen 712. The angle of the user's head has not changed. The content that is presented on the display screen is still centred on 60°. This is because the angle of the user's head has not changed and because the glance has not been released by the gaze point 742 entering a release zone.

If the release zone 737 was still in its original location (as shown in FIG. 7*b*), then the user's gaze direction as it is shown in FIG. 7*b* would have caused the glance to be released and the glance-induced offset of 30° to be removed. Such a release would likely be unwanted because it would potentially remove the object that the user is wanting to look at from the content that is presented on the display screen 712. Therefore, in this example the user is able to change their head pose such that they are facing in a specific direction (to the right in FIG. 7*e*) in order to assign a new location for the release zone 737 such that it is spaced apart its previous location in the opposite direction and avoid that unwanted release.

Figure 7F:
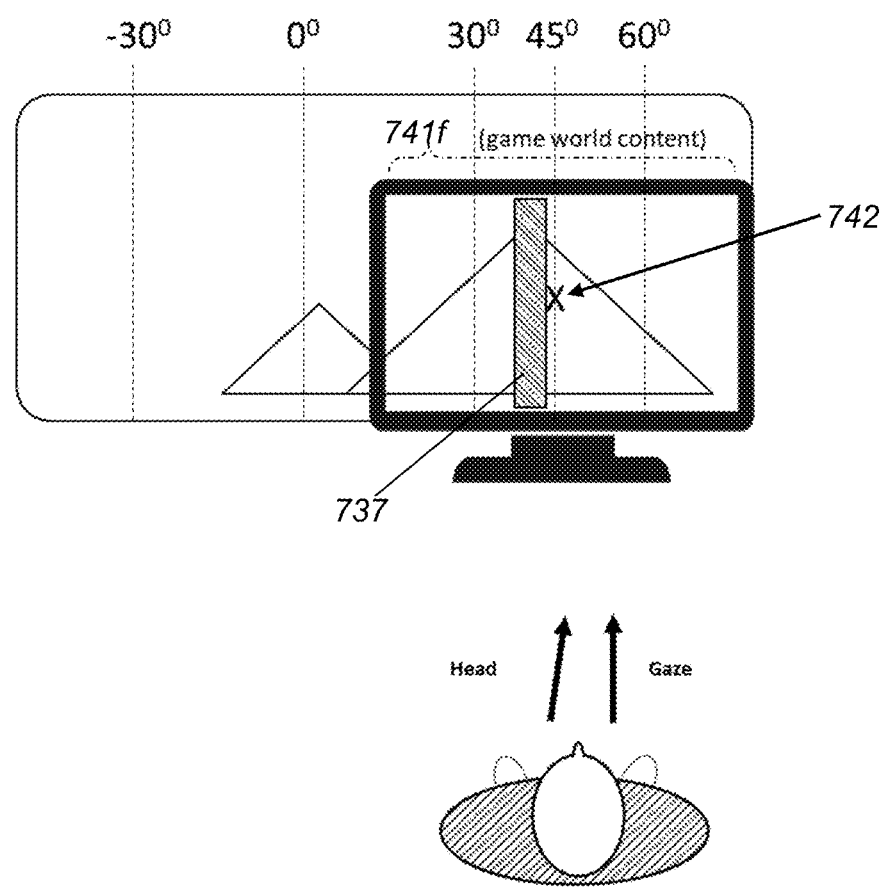

In FIG. 7f, the user's gaze point 742 remains in a central region of the display screen 712. The angle of the user's head is starting to change such that it is closer to facing directly forwards towards the display screen 712. That is, the angle of the user's head is reducing, where a value of 0° represents an angular that is perpendicular to the display screen 712. This change in the associated head-pose-signal causes the associated underlying sub-range of the relative angles of the displayable content (that is based on head angle) to decrease by 15°. When this is combined with the glance-induced offset value of 30°, an updated offsetted-sub-range 741f of relative angles is centred on 45°. Also, the reduction in head angle causes the release zone 737 to be assigned a new location such that it has moved back to a location that is closer to the centre of the display screen 712. Again, the release zone 737 has been assigned a new location such that it has moved in the opposite direction to the change in the angle of the head direction.

Figure 7G:
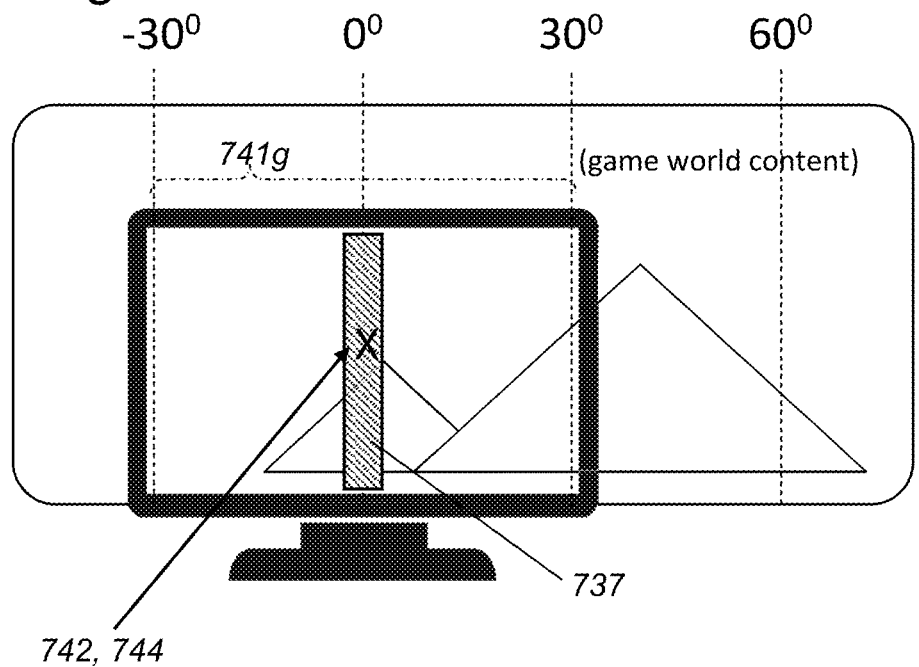
Figure 7G:
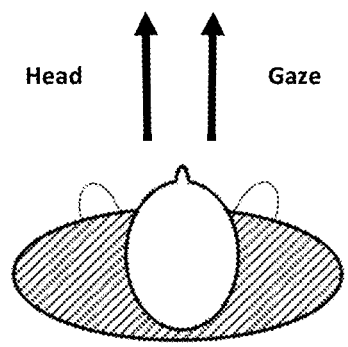

In FIG. 7g, the user's gaze point 742 remains in a central region of the display screen 712. The angle of the user's head has returned to 0°. This change in the associated head-pose-signal causes the associated underlying sub-range of the relative angles of the displayable content (that is based on head angle) to return to 0° (i.e., the same as it was in FIG. 7a). Furthermore, the further reduction in head angle has caused the release zone 737 to now be located in the centre of the display screen 712 such that the gaze point 742 sits within the release zone 737. Therefore, the gaze point 742 is at a release location 744 in FIG. 7g. As a result, the glance-induced offset of +30° is removed and the display screen 712 presents a portion of the displayable content to the user based on a sub-range 741g of relative angles that is associated with only the head-pose-signal. In FIG. 7g, therefore, the sub-range 741g of relative angles is centred on 0°.

The functionality illustrated by FIGS. 7a-7b corresponds to detecting that the gaze-signal represents the trigger location on the display screen. The functionality illustrated by FIGS. 7c-7g, as it relates to causing a different portion of the displayable content to be presented to user as they change the angle of their head after a glance has been triggered, can be summarised as repeatedly performing the following steps:

using the head-pose-signal to determine an updated offsetted-sub-range of relative angles of the displayable content (i.e., tracking the head pose and changing the camera angle accordingly); and causing the display screen to present a portion of the displayable content to the user based on the determined updated offsetted-sub-range of relative angles.

The functionality illustrated by FIGS. 7c-7g, as it relates to changing the location of a release zone on the display screen, can be summarised as repeatedly performing the following steps:

using the head-pose-signal to determine the locations of one or more release zones on the display screen;

comparing the gaze-signal with the one or more release zones on the display screen; and in response to detecting that the gaze-signal represents a release location when the gaze signal represents a location in the one or more release zones, causing the display screen to present the portion of the displayable content that is based on the determined sub-range of relative angles (i.e., without the glance-induced offset applied).

As discussed above, using the head-pose-signal to determine the locations of one or more release zones on the display screen in the example of FIGS. 7a-7g also involves assigning a new location for one or more of the release zones that is spaced apart from its previous location in the opposite direction to the movement of the head in order to reduce the likelihood of an unwanted release of the glance such that the user can no longer see an object that they are wanting to look at.

The functionality that is described with reference to FIGS. 7a-7g further improves gaming immersion, and can be referred to as use of a dynamic release zone. This can provide a smoother transition when the in-game camera angle (as represented by what portion of the displayable content is presented on the display screen) moves from the glance angle to the released position. It can also compensate for any head or eye movement during this journey back to the released position. If the user is looking straight ahead (with their pupils centred in their eyes), and they then glance to the right to look at an object that is in their right-side peripheral view zone then their pupils will be in the corner of their eyes. Then, the user rotates their head towards the object. They perceive that they only turn their head, but in fact by rotating their head they are effectively resetting the pupil to its centre position in their eyes as their gaze follows the object being viewed (this can be referred to as smooth pursuit). This is in effect what is being addressed by the dynamic release zone of FIGS. 7a-7g, so that this action becomes as natural on screen as it is in real life. This can be achieved in the following way: when facing forward and a glance occurs; the release zone is where it is set up in screen space. But when turning their head in the glance direction, the release zone is moved in the opposite direction in screen space. This is because, if the user focuses on an object while turning their head, the game camera rotates as a result of the head tracking and the gaze focused on the object will move in the opposite direction. Therefore, if the release zone were to stay at its original location, an involuntarily glance release can be triggered. The processing that is illustrated in FIGS. 7a-7g can compensate for this.

As different users can prefer different behaviours when using the glance detection and release described herein; when it comes to the gaming immersiveness and also to counter motion sickness or nausea, various different methods can be used to strike a balance between these requirements. Three such methods will be described with reference to FIGS. 8-10.

Figure 8:
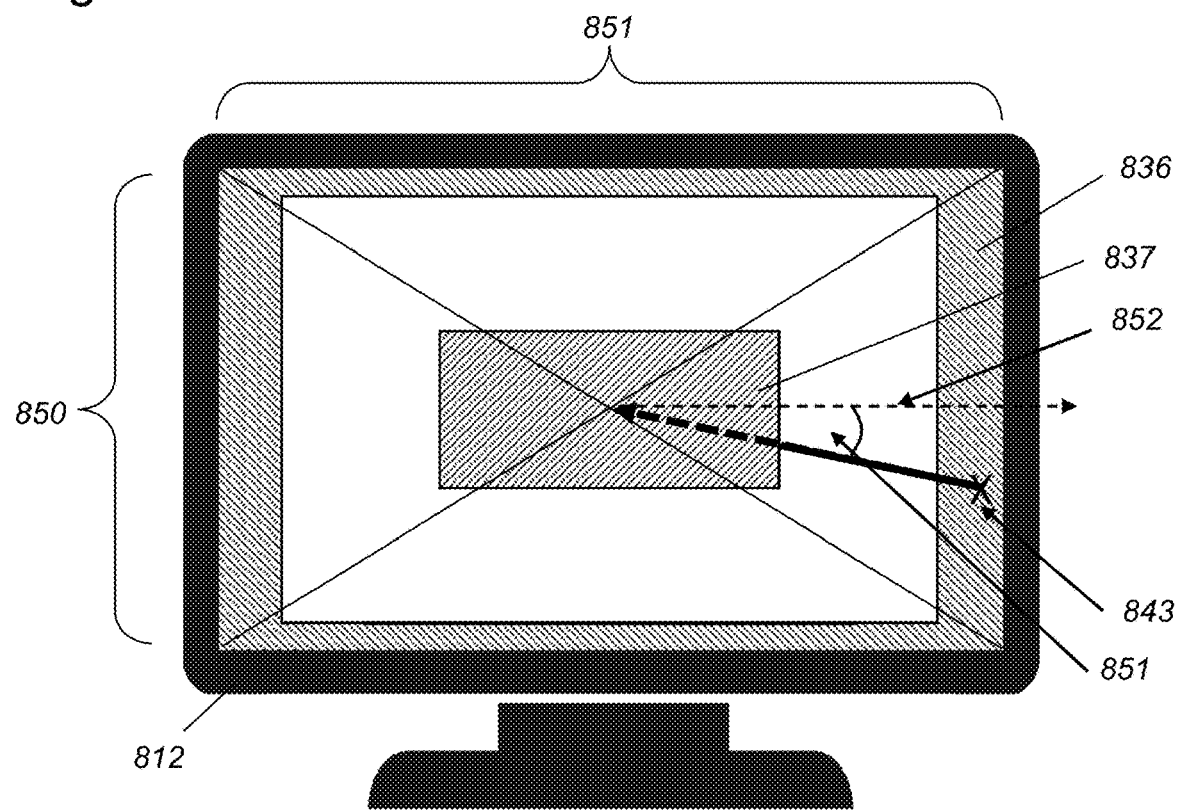
FIG. 8 illustrates an example of a display screen that is displaying a portion of displayable content that will be used to describe one method of controlling what portion of the displayable content is presented after a glance has been triggered, and how that glance can be released.

FIG. 8 illustrates an example of a display screen 812 that is displaying a portion of displayable content that will be used to describe one method of controlling what portion of the displayable content is presented after a glance has been triggered, and how that glance can be released.

We will start by describing the two-dimensional nature of the displayable content and the display screen 812 that is illustrated in FIG. 8. As indicated above, any of the examples that are described herein with reference to only one dimension can readily be expanded to the two dimensions that will be described with reference to FIG. 8.

In FIG. 8, the displayable content is two-dimensional in that it covers: a first range of relative angles in a first dimension, which is a horizontal dimension in FIG. 8; and a second range of relative angles in a second dimension, which is a vertical dimension in FIG. 8. By way of non-limiting example: the first range of relative angles in the first dimension may extend between −180° and +180° such that the user can look all around themselves in a horizontal plane; and the second range of relative angles in the second dimension may extend between −90° and +90° such that the user can look vertically all the way up or vertically all the way down.

In a similar way to that described above, the eye tracking system uses the head-pose-signal to determine: a first sub-range of the relative angles of the displayable content in the first dimension; and a second sub-range of the relative angles of the displayable content in the second dimension. That is, it determines the starting point for the 2-dimensional content that is presented on the display screen 812 before a glance is triggered. Then, upon detecting that the gaze-signal represents a trigger location 843 on the display screen 812, the eye tracking system calculates a glance-induced offset angle 851 based on the position of the trigger location 843 in relation to a central region of the display screen. More particularly, the glance-induced offset angle 851 can be defined as the angle between: i) the line between the trigger location 843 and the centre of the screen; and ii) an arbitrary reference axis 852. An example of an arbitrary reference axis 852 is shown in FIG. 8 as extending horizontally to the right from the centre of the display screen 812. In the same way as described above, the glance-induced offset angle 851 defines the direction of the in-game camera transition that is applied in response to detecting a glance. Therefore, the eye tracking system determines a two-dimensional glance-induced offset value based on the glance-induced offset angle. The eye tracking system applies the two-dimensional glance-induced offset value to the determined first and second sub-range of relative angles to calculate respective first and second offsetted-sub-ranges of relative angles, and then causes the display screen 812 to present a portion of the displayable content to the user based on the calculated first and second offsetted-sub-ranges of relative angles. In the same way as discussed above, this causes the portion of the displayable content that is presented on the display screen 812 to jump by a certain amount in a direction that extends from the centre of the display screen 812 out towards, and beyond, the trigger location 843.

This aspect of the functionality of FIG. 8 can be generalised as follows. The eye tracking system can use the position of a trigger-location on the display screen to calculate a glance-induced offset angle based on the position of the trigger location in relation to a central region of the display screen. For instance, the glance-induced offset angle can represent the angle between: i) the line between the trigger location and the centre of the display screen; and ii) an arbitrary reference axis that extends from the centre of the display screen. This glance-induced offset angle thereby defines the direction of the glance-induced transition. The magnitude of the glance-induced offset is based on the angle of the user's head relative to the display screen, as defined by the head-pose-signal. In such an example, therefore, the glance-induced offset can have a directional component and a magnitude component. One way that this can be implemented is for the glance-induced offset to be provided as a vector.

In this example, when a glance is triggered (as shown in FIG. 8), the glance-induced offset angle 851 is fixed until the glance is released by the gaze point entering a release zone 837. The result is that when the release occurs, the glance-induced offset is removed in the same direction that it was applied. Therefore, this functionality does not permit a change the glance-induced offset angle 851 until a new trigger location is detected. An advantage to this functionality is that it can result in minimal side effects of nausea and motion sickness for the user. A potential downside is that the gaming experience can be less immersive as it does not respond to the user looking at a different region of the display screen 812 that does not correspond to the glance-induced offset angle 851.

Figure 9:
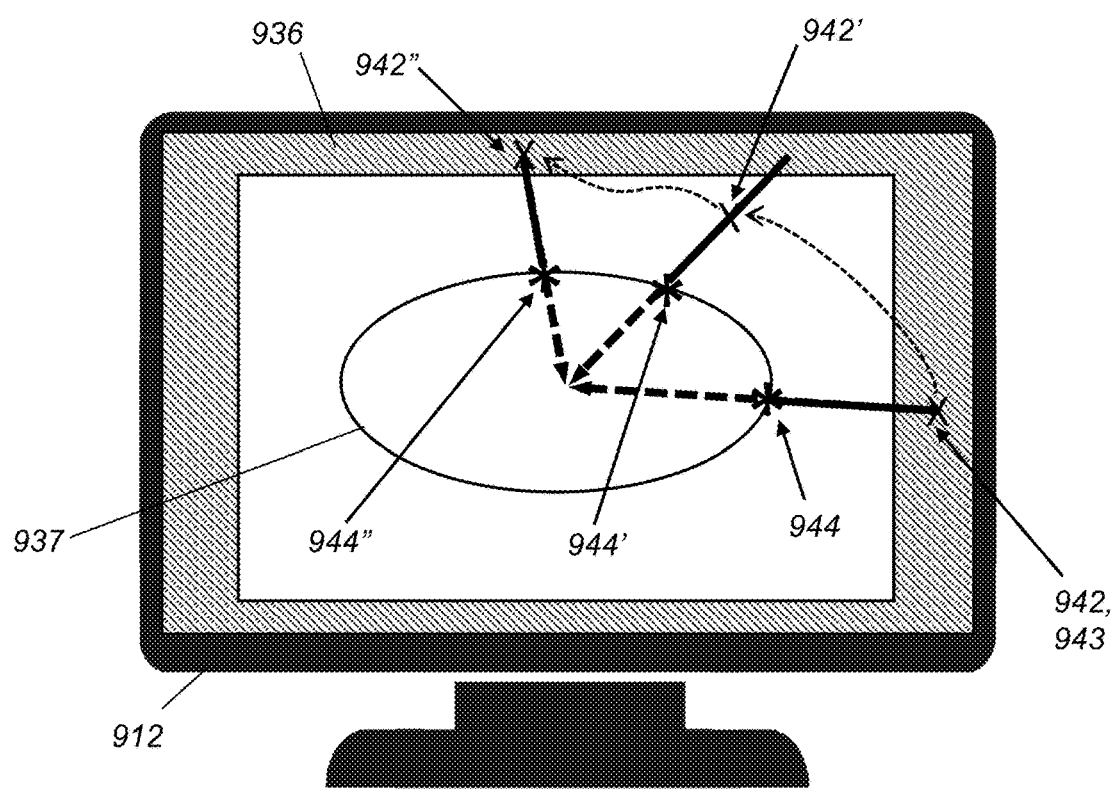
FIG. 9 illustrates an example of a display screen that is displaying a portion of displayable content that will be used to describe another method of controlling what portion of the displayable content is presented after a glance has been triggered, and how that glance can be released.

FIG. 9 illustrates an example of a display screen 912 that is displaying a portion of displayable content that will be used to describe another method of controlling what portion of the displayable content is presented after a glance has been triggered, and how that glance can be released.

In this example, a glance is triggered by the gaze point 942 being detected in the trigger zone 936, such that an initial trigger location 943 is identified. The eye tracking system calculates a glance-induced offset angle (not labelled in FIG. 9) in the same way that is described with reference to FIG. 8, based on the position of the trigger location 943 in relation to a central region of the display screen 912. The glance-induced offset angle defines the direction of the in-game camera transition that is applied in response to detecting the glance. Therefore, the eye tracking system determines a two-dimensional glance-induced offset value based on the glance-induced offset angle and applies it such that the display screen 912 presents a portion of the displayable content to the user based on the calculated first and second offsetted-sub-ranges of relative angles. In contrast to FIG. 8, however, in this example the glance-induced offset angle is not fixed until the glance is released by the gaze point entering a release zone 937. Instead, it can be adjusted based on movement of the gaze point as will be described below.

As shown schematically in FIG. 9, after the initial trigger location 943 is detected, the gaze point moves up and left to another gaze point 942', which is at a position that is in between the trigger zone 936 and the release zone 937. As the gaze point moves in this way, the glance-induced offset angle is recalculated and applied for each point along its path such that the portion of the displayable content that is presented to the user on the display screen 912 is updated accordingly, still with the glance-induced offset applied because the gaze point has not entered a release zone 937. The same processing is performed as the gaze point moves onwards to another gaze point 942", which in this example happens to be located in the trigger zone 936.

This functionality can be summarised by the eye tracking system repeatedly performing the following steps until the gaze-signal represents a release location on the display screen:

identifying a change in the gaze-signal;

calculating an updated glance-induced offset angle based on the gaze-signal in relation to the central region of the display screen;

determining an updated two-dimensional glance-induced offset value based on the updated glance-induced offset angle;

applying the two-dimensional glance-induced offset value to the determined first and second sub-range of relative angles to calculate respective first and second updated offsetted-sub-ranges of relative angles; and causing the display screen to present a portion of the displayable content to the user based on the calculated first and second updated offsetted-sub-ranges of relative angles.

Also, in the example of FIG. 9, the release zone 937 is implemented in a different way to that described above with reference to FIG. 4. In this example, the periphery of the release zone 937 is defined as a predetermined proportion of a release vector that extends back from the trigger zone 936 in a straight line through the gaze point to the centre of the display screen 912. Due to the aspect ratio of the display screen in this example, the effective shape of the release zone 937 is an ellipse. The potential release points 944, 944', 944" associated with each of the gaze points 942, 942', 942" shown in FIG. 9 are identified with asterisks in the drawing.

In this example, since the glance-induced offset angle is not fixed until the glance is released by the gaze point entering a release zone 937, when the release does occur it results in the glance-induced offset being removed in a direction that corresponds to the release vector.

In this way, the glance-induced offset angle that the in-game camera will follow can continuously update according to where the user's gaze is pointing. This means that the camera will keep moving even after a glance has been triggered and follow the gaze continuously until a release behaviour is triggered. This gives a high degree of gaze-to-change responsiveness. Some users may prefer this option due to its gaze sensitivity, however an unwanted side effect can be nausea or motion sickness.

Figure 10:
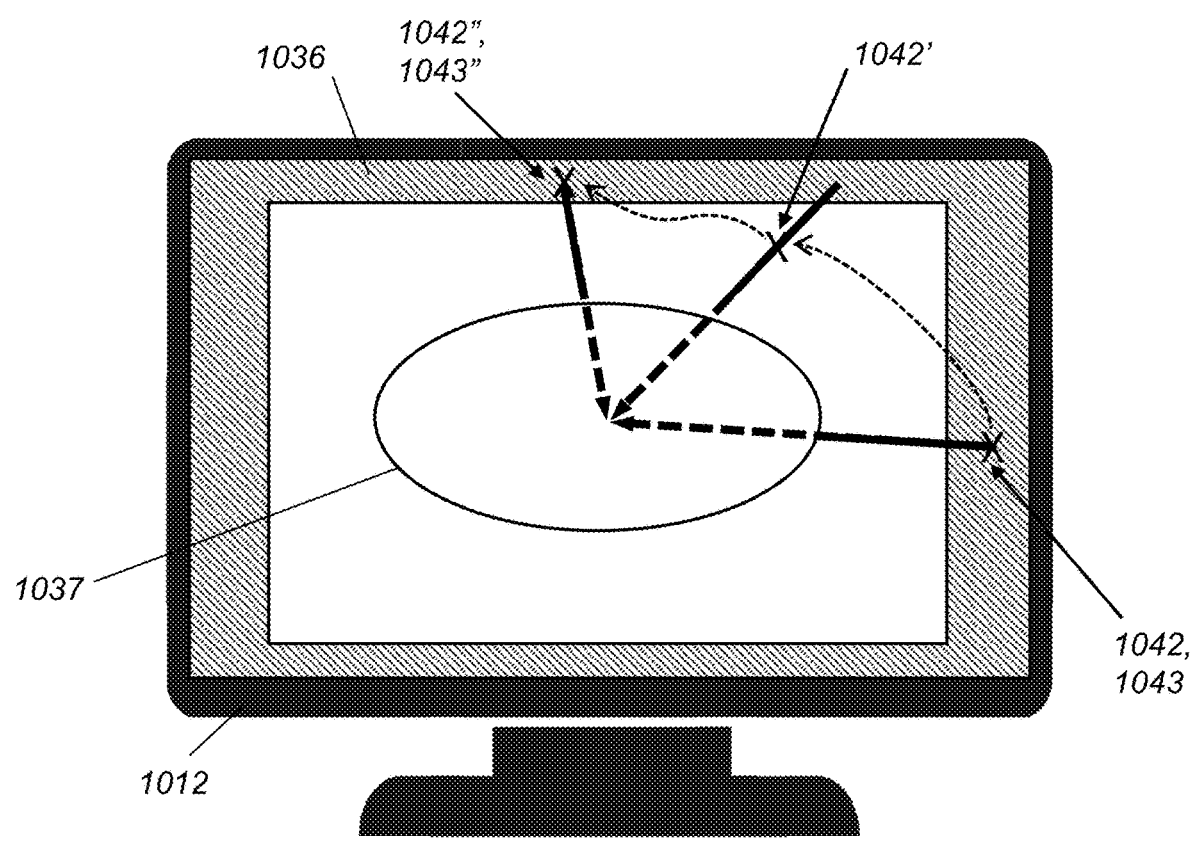
FIG. 10 illustrates an example of a display screen that is displaying a portion of displayable content that will be used to describe a yet further method of controlling what portion of the displayable content is presented after a glance has been triggered, and how that glance can be released.

FIG. 10 illustrates an example of a display screen 1012 that is displaying a portion of displayable content that will be used to describe a yet further method of controlling what portion of the displayable content is presented after a glance has been triggered, and how that glance can be released.

FIG. 10 shows the same gaze points 1042, 1042', 1042" as those that are shown in FIG. 9. This method is similar to that of FIG. 9, although the glance-induced offset angle is only updated for gaze points 1042, 1042" that are located in the trigger zone 1036. That is, only for trigger locations 1043, 1043". The glance-induced offset angle is not updated for gaze points 1042' that are not located in the trigger zone 1036. Therefore, when the user is looking at the region between the trigger zone 1036 and the release zone 1037 the portion of displayable content that is presented on the display screen 1012 is not updated.

This functionality can be summarised as repeatedly performing the following steps until the gaze-signal represents a release location on the display screen:
  identifying a change in the gaze-signal;
  if the changed gaze-signal represents a trigger location, then:
    calculating an updated glance-induced offset angle based on the gaze-signal in relation to the central region of the display screen;
    determining an updated two-dimensional glance-induced offset value based on the updated glance-induced offset angle;
    applying the two-dimensional glance-induced offset value to the determined first and second sub-range of relative angles to calculate respective first and second updated offsetted-sub-ranges of relative angles; and
    causing the display screen to present a portion of the displayable content to the user based on the calculated first and second updated offsetted-sub-ranges of relative angles; and
  if the changed gaze-signal does not represent a trigger location, then:
    causing the display screen to continue to present the portion of the displayable content that is currently being displayed.

This method gives the user an experience that aims to both allow for the in-game camera to change angle by the gaze angle changing the glance angle, but requires the gaze point that causes a change to the glance angle to be in the trigger zone 1036. This to ensure that not every detected change in gaze angle affects the in-game camera movement; only gaze angle changes that are interpreted as an intention to change the glance angle are translated into in-game camera movement.

Some additional functionality that can be provided by the systems and methods described herein include the prevention of recognising an unwanted downward glance that could occur when the user wants to look down at the keyboard, for example. This can be addressed by the method having an option for disabling downward glancing.

That is, the trigger zones can be defined such that they do not include one or more regions that are below the central region of the display screen. To enable the user to look down in-game, the head-pose-signal can still be used to determine a sub-range of the relative angles of the displayable content that represents a downward movement of the in-game camera; it is just that a glance cannot be triggered directly downwards, or within a predetermined threshold angle of directly downwards from the centre of the display screen. Therefore, to look downwards the user simply tilts his/her head downwards.

One or more of the examples described herein enable users, such as gamers that use display screens, access to in-game content that would normally be available in real life (peripheral sight), as if they were standing inside the game or that can be achieved using a VR headset. This is without distorting the in-game perspective (altered field of view). Methods disclosed herein can entail exposing content that is just outside the display screen in a way that resembles how the user would glance in real life, thus introducing saccade and ballistic movement to the in-game camera. This can therefore enhancing head tracking by adding eye tracking to trigger a ballistic reveal of in-game content just outside the display screen border. Furthermore, this can improve the in-game experience (based on an ability to look around using head tracking) by adding extra dynamic viewing angles, thus keeping the head movement sensitivity in the playable range and with reduced nausea.

Although the majority of this disclosure relates to yaw directions, it will be appreciated that the disclosure will also apply to the pitch direction and/or roll direction, and any combination thereof. In addition, in some examples the system/method can also detect the user's head position in x, y and/or z directions such that the detected head position can also be used to control the in-game camera.

The invention claimed is:

1. A method of operating an eye tracking system to present a portion of displayable content to a user on a display screen, wherein the displayable content covers a range of relative angles, and wherein the method comprises:
  receiving a head-pose-signal that represents an angle of the user's head relative to the display screen;
  receiving a gaze-signal that represents a position on the display screen that intersects with a gaze direction of the user;
  using the head-pose-signal to determine a sub-range of the relative angles of the displayable content;
  causing the display screen to present a portion of the displayable content to the user based on the determined sub-range of relative angles; and
  upon detecting that the gaze-signal represents a trigger location on the display screen:
    calculating a glance-induced offset based on the position of the trigger location;

applying the glance-induced offset to the determined sub-range of relative angles to calculate an offsetted-sub-range of relative angles; and causing the display screen to present a portion of the displayable content to the user based on the calculated offsetted wherein: the displayable content covers a first range of relative angles in a first dimension and a second range of relative angles in a second dimension; and the method comprises:

using the head-pose-signal to determine: a first sub-range of the relative angles of the displayable content in the first dimension; and a second sub-range of the relative angles of the displayable content in the second dimension; and upon detecting that the gaze-signal represents the trigger location on the display screen, the method comprises:
calculating a glance-induced offset angle based on the position of the trigger location in relation to a substantially central region of the display screen;
determining a two-dimensional glance-induced offset value based on the glance-induced offset angle;
applying the two-dimensional glance-induced offset value to the determined first and second sub-range of relative angles to calculate respective first and second offsetted-sub-ranges of relative angles; and
causing the display screen to present a portion of the displayable content to the user based on the calculated first and second offsetted-sub-ranges of relative angles.

2. The method of claim 1, further comprising:
comparing the gaze-signal with one or more trigger zones associated with the display screen, and detecting that the gaze-signal represents a trigger location when the gaze signal represents a location in the one or more trigger zones.

3. The method of claim 2, wherein the trigger zone represents a region at the periphery of the display screen.

4. The method of claim 1, further comprising:
setting the size of the glance-induced offset based on the head-pose-signal.

5. The method of claim 1, wherein:
causing the display screen to present the portion of the displayable content to the user based on the calculated offsetted-sub-range of relative angles comprises:
transitioning from presenting the portion of displayable content based on the determined sub-range of relative angles to presenting the portion of the displayable content based on the calculated offsetted-sub-range of relative angles at an image transition rate that is faster than an image transition rate for changing the portion of displayable content that is based solely on the head-pose-signal.

6. The method of claim 1, wherein:
causing the display screen to present the portion of the displayable content to the user based on the calculated offsetted-sub-range of relative angles comprises:
transitioning from presenting the portion of displayable content based on the determined sub-range of relative angles to presenting the portion of the displayable content based on the calculated offsetted-sub-range of relative angles accompanied by presenting a motion effect on the display screen.

7. The method of claim 1, wherein subsequent to detecting that the gaze-signal represents the trigger location on the display screen, and upon detecting that the gaze-signal represents a release location on the display screen:

causing the display screen to present the portion of the displayable content that is based on the determined sub-range of relative angles.

8. The method of claim 7, further comprising:
comparing the gaze-signal with one or more release zones associated with the display screen, and detecting that the gaze-signal represents a release location when the gaze signal represents a location in the one or more release zones.

9. The method of claim 1, wherein subsequent to detecting that the gaze-signal represents the trigger location on the display screen, the method comprises repeatedly:
using the head-pose-signal to determine an updated offsetted-sub-range of relative angles of the displayable content; and
causing the display screen to present a portion of the displayable content to the user based on the determined updated offsetted-sub-range of relative angles.

10. The method of claim 1, wherein subsequent to detecting that the gaze-signal represents the trigger location on the display screen, the method comprises repeatedly:
using the head-pose-signal to determine the locations of one or more release zones on the display screen;
comparing the gaze-signal with the one or more release zones on the display screen; and
in response to detecting that the gaze-signal represents a release location when the gaze signal represents a location in the one or more release zones, causing the display screen to present the portion of the displayable content that is based on the determined sub-range of relative angles.

11. The method of claim 10, wherein using the head-pose-signal to determine the locations of one or more release zones on the display screen comprises assigning a new location for one or more of the release zones that is spaced apart from its previous location in the opposite direction to a movement of the head as determined by the head-pose-signal.

12. The method of claim 1, wherein subsequent to detecting that the gaze-signal represents a trigger location on the display screen, repeatedly performing the following steps until the gaze-signal represents a release location on the display screen:
identifying a change in the head-pose-signal;
determining an updated sub-range of the relative angles of the displayable content based on the head-pose-signal;
applying the glance-induced offset to the updated sub-range of relative angles to calculate an updated offsetted-sub-range of relative angles; and
causing the display screen to present a portion of the displayable content to the user based on the calculated updated offsetted-sub-range of relative angles.

13. The method of claim 1, further comprising repeatedly performing the following steps until the gaze-signal represents a release location on the display screen:
identifying a change in the gaze-signal;
calculating an updated glance-induced offset angle based on the gaze-signal in relation to the central region of the display screen;
determining an updated two-dimensional glance-induced offset value based on the updated glance-induced offset angle;
applying the two-dimensional glance-induced offset value to the determined first and second sub-range of relative angles to calculate respective first and second updated offsetted-sub-ranges of relative angles; and causing the display screen to present a portion of the displayable content to the user based on the calculated first and second updated offsetted-sub-ranges of relative angles.

14. The method of claim 1, further comprising repeatedly performing the following steps until the gaze-signal represents a release location on the display screen:
identifying a change in the gaze-signal;
if the changed gaze-signal represents a trigger location, then:
calculating an updated glance-induced offset angle based on the gaze-signal in relation to the central region of the display screen;
determining an updated two-dimensional glance-induced offset value based on the updated glance-induced offset angle;
applying the two-dimensional glance-induced offset value to the determined first and second sub-range of relative angles to calculate respective first and second updated offsetted-sub-ranges of relative angles; and
causing the display screen to present a portion of the displayable content to the user based on the calculated first and second updated offsetted-sub-ranges of relative angles; and
if the changed gaze-signal does not represent a trigger location, then:
causing the display screen to continue to present the portion of the displayable content that is currently being displayed.

15. An eye tracking system configured to perform the method of claim 1.

16. A non-transitory computer-readable medium storing instruction which, when executed by an eye tracking system cause the system to perform the method steps of claim 1.

* * * * *